US007733041B2

(12) United States Patent
Ishizaki

(10) Patent No.: US 7,733,041 B2
(45) Date of Patent: Jun. 8, 2010

(54) METHOD AND DEVICE FOR DRIVING ROTATING-BODY, PROCESS CARTRIDGE, IMAGE FORMING APPARATUS, AND COMPUTER PROGRAM PRODUCT

(75) Inventor: Yuusuke Ishizaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 402 days.

(21) Appl. No.: 11/717,011

(22) Filed: Mar. 13, 2007

(65) Prior Publication Data

US 2007/0229005 A1 Oct. 4, 2007

(30) Foreign Application Priority Data

Mar. 15, 2006 (JP) ............................. 2006-070583

(51) Int. Cl.
*H02P 25/08* (2006.01)

(52) U.S. Cl. .................... 318/254.1; 318/610; 318/621; 318/632

(58) Field of Classification Search .............. 318/254.1, 318/610, 621, 632
See application file for complete search history.

(56) References Cited

U.S. PATENT DOCUMENTS 4,472,056 A * 9/1984 Nakagawa et al. .......... 356/607
5,596,403 A * 1/1997 Schiff et al. ............ 356/139.03
6,272,401 B1 * 8/2001 Boger et al. ................ 700/282
6,408,157 B1 * 6/2002 Tanaka et al. ............... 399/301
6,519,432 B1 * 2/2003 Matsumoto ................. 399/167
6,859,006 B2 * 2/2005 Hayashi ...................... 318/610
7,127,189 B2 10/2006 Takamatsu et al.
7,343,119 B2 * 3/2008 Matsuda et al. ............. 399/167

FOREIGN PATENT DOCUMENTS

JP 2004-282990 10/2004
JP 2005-312262 11/2005

* cited by examiner

*Primary Examiner*—Walter Benson
*Assistant Examiner*—David S Luo
(74) *Attorney, Agent, or Firm*—Harness, Dickey & Pierce, P.L.C.

(57) ABSTRACT

A plurality of detection target portions are arranged around a rotating shaft of a rotating-body, one of which causes a detector to generate a first detection signal different from a second detection signal generated from the others. A first generating unit generates a reference signal indicating a reference rotational-position of the rotation-driving source or the rotating-body before one rotation from a timing of the first detection signal. A second generating unit reads periodic variation information from a storage unit based on the reference signal, and generates a rotation-velocity correction signal for the rotation-driving source.

17 Claims, 25 Drawing Sheets

RELATED ART

RELATED ART

METHOD AND DEVICE FOR DRIVING ROTATING-BODY, PROCESS CARTRIDGE, IMAGE FORMING APPARATUS, AND COMPUTER PROGRAM PRODUCT

CROSS-REFERENCE TO RELATED APPLICATIONS

The present document incorporates by reference the entire contents of Japanese priority document, 2006-070583 filed in Japan on Mar. 15, 2006.

BACKGROUND OF THE INVENTION

1. Field of the Invention

The present invention generally relates to a technology for driving a rotating-body by transmitting a rotation force from a rotation-driving source via a rotation-force transmission mechanism.

2. Description of the Related Art

In an electrophotographic-system image forming apparatus that forms an image by forming toner images on a surface of a photoconductive drum and transferring them to a recording sheet, for example, it is necessary to accurately match peripheral velocity of a photoconductive drum with a carrier speed of a recording sheet to transfer toner images formed on a surface of a photoconductive drum to a recording sheet without change.

When the photoconductive drum is rotated and driven, for example, by a DC motor, it is general on account of stabilization of rotation velocity and securement of a driving torque that the motor is rotated relatively at high velocity and the rotation velocity is reduced by decelerating means such as a gear reducer to drive the photoconductive drum. However, in this event, even if the motor as a rotation-driving source is rotated at a stable velocity, periodic variation occurs in rotation velocity of the photoconductive drum due to a difference in processing accuracy (an accumulated pitch difference concerning a gear, decentering of a rotating shaft, and the like) in a rotation force transmission mechanism that includes a gear. As a result, there is a possibility that a reproduced image is degraded.

Therefore, a rotating-body driving device is proposed to correct this velocity variation that, on condition that a motor is previously rotated at a certain velocity in shipment of an image forming apparatus, exchange of a photoconductive drum, or the like, the rotation force is supplied through a rotation force transmission mechanism to a rotating-body, and a periodic variation component in rotation velocity of the rotating-body is measured to store it in a memory, reads the periodic variation component from the memory, when using an image forming apparatus, and performs velocity correction in opposite phase to reduce velocity variation of the photoconductive drum (see Japanese Patent Application Laid-open No. 2005-312262).

As shown in FIG. 24, in the rotating-body driving device, a disk-shaped detection target body (encoder) 111 that includes a single slit 114 for detecting a reference rotational-position and a plurality of slits 113 (4 slits in this case) for detecting the other rotational positions is mounted around a rotating shaft 112 of a photoconductive drum, and a detector 117 that detects a rotational position of each of the slits that move along with rotation of the photoconductive drum is arranged opposite to the encoder 111. A motor is rotated at a certain velocity and a time difference of timing at which the detector 117 detects the slits 113 is detected. After a calculation, a periodic variation component is extracted, as shown in FIG. 25, the component is stored in a memory by corresponding to timing (home position) at which the detector 117 detects the slit 114 and then the slit 113. To correct velocity variation, when detecting the above home position, a periodic variation component is read from the memory based on a phase corresponding to the home position and velocity correction in opposite phase of the periodic variation component is performed so that, as shown in FIGS. 26A and 26B, periodic variation in rotation velocity of the photoconductive drum is controlled.

However, the slit 114 for detecting a reference rotational-position is mounted on the encoder 111 separately from the slits 113 for detecting a time difference in the rotating-body driving device. Therefore, for example, when the number of slits 113 is increased to enhance accuracy of detecting a time difference for accurate extraction of a periodic variation component, it is difficult to provide the slit 114. The slit 114 is a slit only to detect a home position. Therefore, whenever a slit is detected, it is necessary to have determination means to determine once, after the detector 117 detects a slit, whether the slit is for detecting a home position or for detecting correction data and to store only the slit that is determined as a slit to detect correction data in a memory, thereby increasing a load to process software.

Thus, the applicant of the application proposes a rotation detecting device that uses a slit that has a larger width for detection of both a home position and velocity variation by making one of slits 113 shown in FIG. 24 wider in a peripheral direction of the encoder 111, identifying passing of the slit that has a larger width based on a difference of a detection signal from the detector 117 caused by a difference in a width of a slit, counting the number of detection of ends of slits 113 in the peripheral direction (a front end in a rotating direction of the encoder 111) through the detector 117 from the time point, and detecting an end of a slit in the peripheral direction with respect to the number of counting the following slits before detecting the slit 113 that has a larger width ("4" in FIG. 24) as well as generating a home position signal (Patent Application No. 2005-266708).

However, the rotation detecting device identifies passing of the slit that has a larger width and then generates a first home position signal after a rotation of the photoconductive drum. Therefore, until a home position is detected after starting a motor and the photoconductive drum rotates once, correction of velocity variation is not started. It is required to reduce time to form a first copy in an image forming apparatus in view of energy saving and appliance with respect to a user. It is necessary, to meet the requirement, to form an image on a photoconductor in a possibly short time after start of a motor. However, it is impossible for the rotation detecting device to sufficiently meet the requirement of reducing time to copy.

SUMMARY OF THE INVENTION

It is an object of the present invention to at least partially solve the problems in the conventional technology.

A device for driving a rotating-body according to one aspect of the present invention includes a rotation-driving source that outputs a rotation force; a transmission mechanism that transmits the rotation force of the rotation-driving source; a rotating-body that is connected to the transmission mechanism and that is rotated by the rotation force of the rotation-driving source; a plurality of detection target portions arranged around a rotating shaft of the rotating-body, one of which causes a first detection signal to be generated, which is different from a second detection signal generated from other of the detection target portions; a detector that detects the detection target portions at a predetermined rotational-position, and generates the detection signals; a first reference-signal generating unit that generates a reference signal for indicating a reference rotational-position of the rotation-driving source or the rotating-body before one rotation of the rotation-driving source or the rotating-body from a timing of the first detection signal; a storage unit that stores periodic variation information about rotation velocity of the rotating-body and a measured value of phase information thereof; and a signal generating unit that reads the periodic variation information from the storage unit based on the reference signal, and generates a rotation-velocity correction signal for the rotation-driving source.

A device for driving a rotating-body, according to another aspect of the present invention includes a rotation-driving source that outputs a rotation force; a transmission mechanism that transmits the rotation force of the rotation-driving source; a rotating-body that is connected to the transmission mechanism and that is rotated by the rotation force of the rotation-driving source; a plurality of detection target portions arranged around a rotating shaft of the rotating-body, one of which causes a first detection signal to be generated, which is different from a second detection signal generated from other of the detection target portions; a plurality of detectors that detect the detection target portions at each predetermined rotational-position, and generate the detection signals; a first reference-signal generating unit that generates a reference signal for indicating a reference rotational-position of the rotation-driving source or the rotating-body whenever the rotation-driving source or the rotating-body rotates once based on a timing of the first detection signal that is generated first by the detectors; a storage unit that stores periodic variation information about rotation velocity of the rotating-body and a measured value of phase information thereof; and a signal generating unit that reads the periodic variation information from the storage unit based on the reference signal, and generates a rotation-velocity correction signal for the rotation-driving source.

A method of driving a rotating-body according to still another aspect of the present invention includes measuring including rotating a rotation-driving source at a fixed velocity to output a rotation force, supplying the rotation force to the rotating-body via a transmission mechanism, and measuring periodic variation of rotation velocity of the rotating-body; storing measured periodic variation information with reference rotational-position information of the rotating-body; detecting including rotating the rotation-driving source at a fixed velocity, and detecting that one of a plurality of detection target portions arranged around a rotating shaft of the rotating-body from which a first detection signal different from a second detection signal generated from other of the detection target portions is generated exists at a predetermined rotational-position; first generating including generating a reference signal for indicating a reference rotational-position of the rotation-driving source or the rotating-body before the rotation-driving source or the rotating-body rotates once after the one of the detection target portions is detected; and second generating including reading the periodic variation information based on the reference signal, and generating a rotation-velocity correction signal for the rotation-driving source.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings.

Figure 1:
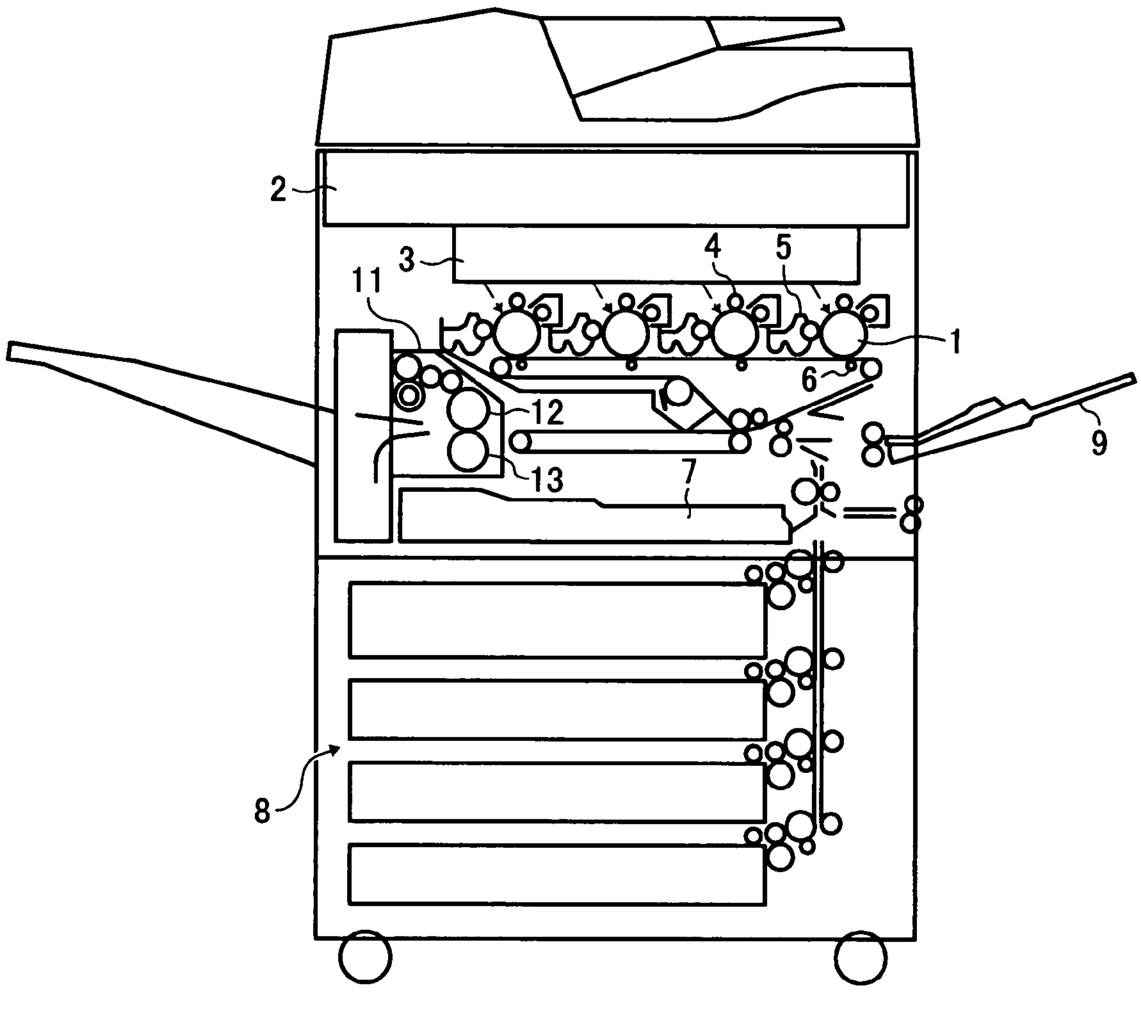
FIG. 1 is a schematic view of an image forming apparatus according to a first embodiment of the present invention.

As shown in FIG. 1, an image forming apparatus according to a first embodiment of the present invention is a color copier that has 4 sets of image forming subunits, cyan (C), yellow (Y), magenta (M), and black (B). The image forming apparatus includes a scanner subunit 2 that performs photoelectric conversion of a light beam reflected from an exposed duplicated document and processing of image data on the read document, a writing subunit 3 that irradiates a photoconductive surface with laser beams that are modulated based on image data and that are from a laser light source whose light emission is controlled, and photoconductive drums 1 whose photoconductive surface is irradiated with laser beams from the writing subunit 3 and on which an electrostatic image is formed.

Around the photoconductive drum 1 are a charging subunit 4 that uniformly charges the photoconductive surface, a developing subunit 5 that adheres toners on the photoconductive drum 1 on which a latent image is formed, and a transfer subunit 6 that transfers a toner image adhered on the photoconductive drum 1 to a transfer paper (through an intermediate transfer belt). The developing and forming an image associated with a rotation of the photoconductive drum 1, here in a tandem system, can be separately performed for each cyan (C), yellow (Y), magenta (M), and black (K) component and each color component can be combined in a transfer process.

A main unit 7 and a paper feeding bank 8 include a paper feeding tray. The main unit 7 also includes a manual feeding rack 9 on its side. The color copier includes a belt fixing unit 11 that supplies heat and pressure to a transfer paper on which an image has been already formed to fuse toners on the paper, a fixing roller 12, and a pressure roller 13.

Figure 2:
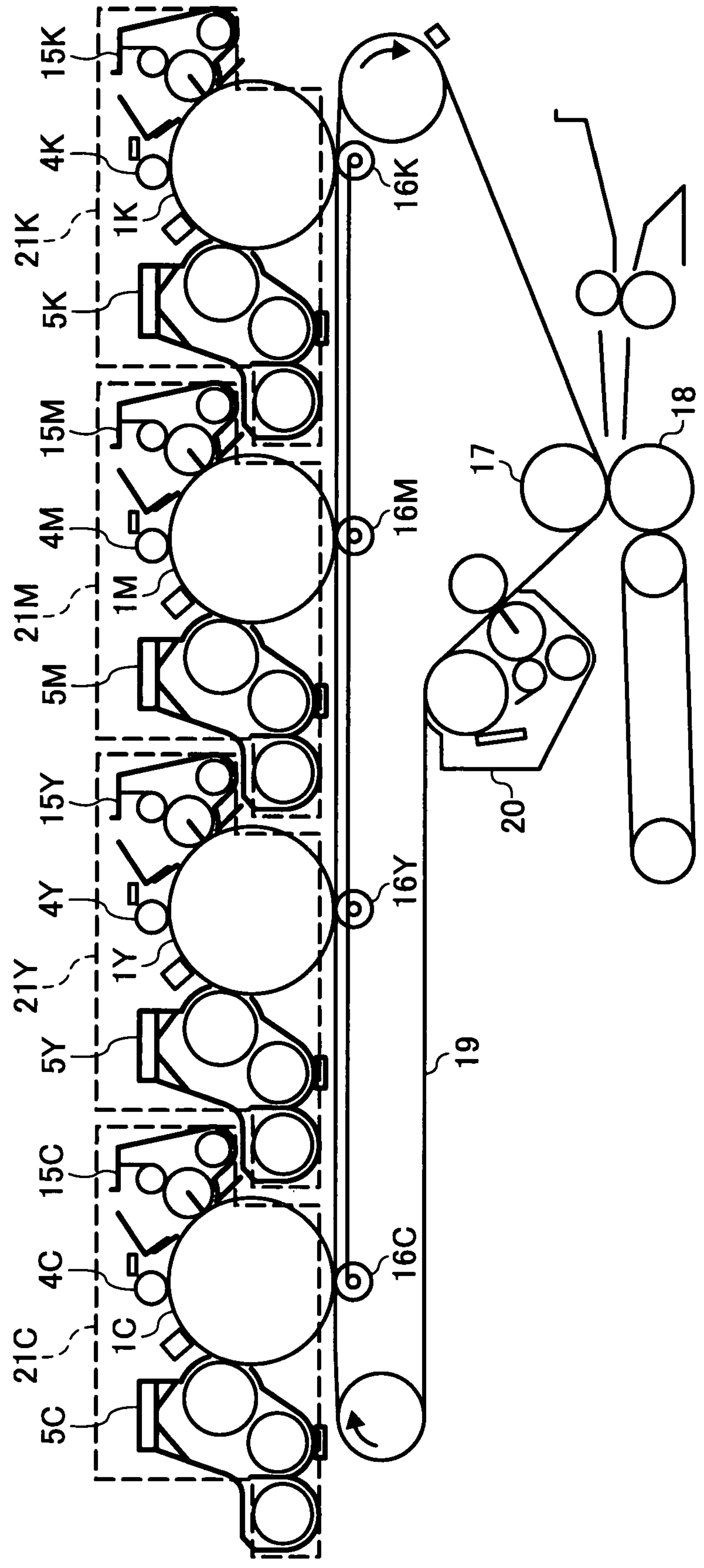
FIG. 2 is a schematic side view of a process cartridge in the image forming apparatus.

FIG. 2 is a schematic side view for explaining essential part of an image forming engine that includes a process cartridge.

Image forming units 21C, 21Y, 21M, and 21K that include charging subunits 4C, 4Y, 4M and 4K (that uniformly charge the photoconductive surface before optical writing), developing subunits 5C, 5Y, 5M, and 5K (that develop an electrostatic latent image generated by optical writing with toners) and cleaning units 15C, 15Y, 15M, and 15K (that cleans residual toners on the photoconductive drum) are around photoconductive drums 1C, 1Y, 1M, and 1K respectively. The image forming units 21C, 21Y, 21M, and 21K serve as a process cartridge that includes the integrated photoconductive drum 1C, the charging subunit 4C, the developing subunit 5K, and the cleaning unit 15K, and are detachably attached to the apparatus body.

An image is formed on a transfer paper according to the first embodiment through two transfer processes in which once a toner image formed on each of photoconductive drums is transferred to an intermediate transfer belt 19 (a first transfer), and the image on the intermediate transfer belt 19 is also transferred to a transfer paper (a second transfer). Image forming is performed through passing a sheet of paper once so that the images transferred to the intermediate transfer belt 19 through the photoconductive drums 1C, 1Y, 1M, and 1K arranged from upstream to downstream of the intermediate transfer belt 19 on which the images move with a predetermined distance away among them are superimposed one another to form a color image, which is then transferred to a transfer paper. In other words, the toner images that are formed on the photoconductive drums 1C, 1Y, 1M, and 1K by four colors of image forming units respectively are first transferred to the intermediate transfer belt 19 in turn by use of primary transfer rollers 16C, 16Y, 16M, and 16K. Color-combined toner images first transferred to the intermediate transfer belt 19 are secondly transferred to the transfer paper through a secondary transfer roller 17 and a secondary transfer opposing roller 18 that is opposite to the secondary transfer roller 17. Toners that remain on the intermediate transfer belt 19 as a residual toner are removed by a belt cleaning unit 20.

An explanation is given about rotation drive control of the photoconductive drums 1C, 1Y, 1M, and 1K in the color image forming apparatus according to the first embodiment. A DC brushless motor is used in the color image forming apparatus shown in FIG. 1 as a motor for driving each of the photoconductive drums 1C, 1Y, 1M, and 1K and rotation velocity of the motor is reduced by velocity reduction means such as a gear-type reducer and rotation of the motor is supplied to the photoconductive drum 1. When each of the photoconductive drums 1C, 1Y, 1M, and 1K is driven by this motor, even if the motor as a driving source is rotated at a stable velocity, periodic variation occurs in rotation velocity of the photoconductive drum 1 due to a difference in processing accuracy of a rotation force transmission mechanism that includes a gear (an accumulated pitch difference concerning a gear, decentering of a rotating shaft, and the like). As a result, there is a likelihood of degrading a reproduced image.

Figure 3:
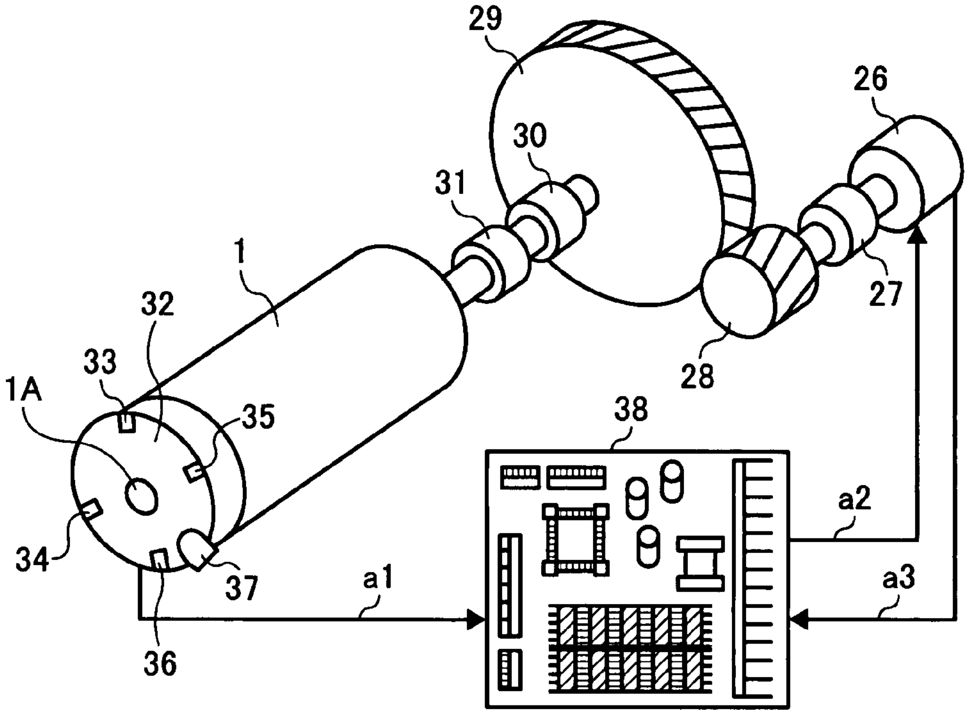
FIG. 3 is a schematic view of a rotating-body driving device.

Therefore, the photoconductive drum is rotated as a rotation body by a rotating-body driving device shown in FIG. 3 so that periodic variation in rotation velocity of the photoconductive drum is reduced according to the first embodiment.

The rotating-body driving device includes a motor 26, a driving gear 28 connected to the motor 26 through a coupling 27, a driven gear 29 mated with the driving gear 28, the photoconductive drum 1 connected to the driven gear 29 through couplings 30, 31, a disk 32 attached around a rotating shaft 1A of the photoconductive drum 1, a detector 37 that detects detection target portions 33 to 36 arranged near a peripheral edge of the disk 32, and a controller 38 that receives a sensor detection signal a1 from the detector 37 and also generates a motor driving control signal a2 to control rotation velocity of the motor 26 based on the received signal to supply it to the motor 26. The controller 38 includes a central processing unit (CPU), a read only memory (ROM), a random access memory (RAM), and an electronically erasable and programmable read only memory (EEPROM) and determines, described later in detail, a periodic variation component of rotation velocity of the photoconductive drum 1 to store it in the EEPROM. When forming an image, the controller reads the periodic variation component from the EEPROM and generates a motor driving control signal a2 to perform velocity correction in opposite phase. The controller 38 also supplies a feedback control signal (not shown) to the motor 26 to rotate it at a certain velocity in response to rotation velocity information a3 sent from a rotation angular velocity detector (not shown) of the motor 26.

Figure 4:
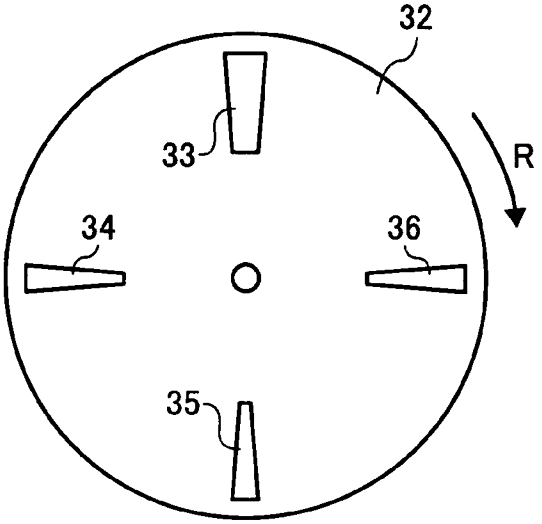
FIG. 4 is a schematic top view of a disk in the rotating-body driving device.

As shown in FIG. 4, detection target portions 33 to 36 are arranged near the edge of the disk 32 at an interval of 90 degrees in a peripheral direction. The detection target portions 33 to 36 are trapezoidal slits. A length of the detection target portion 33 in the peripheral direction (a length of the detection target portion 33 in the peripheral direction of the disk 32=a width of the trapezoid in a radius direction of the disk 32 at the same position) is longer than a length of the other detection target portions 34 to 36 in the peripheral direction. The detector 37 includes a light-emitting element and a light-receiving element that are arranged opposite each other and sandwich the disk 32, or the light-emitting element and the light-receiving element that are arranged side by side on one side of the disk 32 to detect the detection target portions 33 to 36 at a predetermined rotational-position that move in the peripheral direction of the disk 32 when the photoconductive drum 1 is driven and rotated by the motor 26 and the disk 32 rotates. In the case of the opposite arrangement, the detection target portions 33 to 36 are detected based on a fact that light beams that are emitted from the light-emitting element and pass through slits that are detection target portions 33 to 36 are detected by the light-receiving element. In the case of the side-by-side arrangement, the detection target portions 33 to 36 are detected based on a fact that light beams emitted from the light-emitting element do not reflect on a surface of the disk 32, pass through slits that are detection target portions 33 to 36, and are not detected by the light-receiving element.

Duration of a detection signal (time from a rising edge to a falling edge) in either arrangement corresponds to a width of the slit so that duration of a signal to detect the detection target portion 33 that has a larger width is longer than that of the other detection target portions 34 to 36. The detection target portions 34 to 36 and the detector 37 are not limited to a combination of slits, the light-emitting element, and the light-receiving element and can be a combination of a magnetic sensor and a magnetic substance. The detection target portions 34 to 36 are not limited to a trapezoid in shape and can have a shape that is different in a length of the peripheral direction at the same radius position of the disk.

Operation of the rotating-body driving device that has the above configuration is explained.

First of all, prior to correction control to reduce periodic variation that corresponds to a rotation of the photoconductive drum 1, velocity variation in a rotation of the photoconductive drum 1 is detected as correction information for the correction control to store the velocity variation in the EEPROM of the controller 38. This processing is performed, for example, in a manufacturing process before shipment of products or when exchanging the photoconductive drum 1.

When performing this processing, the controller 38 outputs an instruction signal to drive the motor 26 at a target angular velocity ωm and rotates and drives the motor 26. As shown by an arrow R of FIG. 4, it rotates clockwise. When the controller 38 determines that rotation velocity of the motor 26 reaches a target rotation velocity based on rotation velocity information a3 output from the rotation angular velocity detector of the motor 26, the controller 38 detects a home position of the photoconductive drum 1 and determines velocity variation of rotation of the photoconductive drum 1 to store it in the EEPROM.

Figure 5:
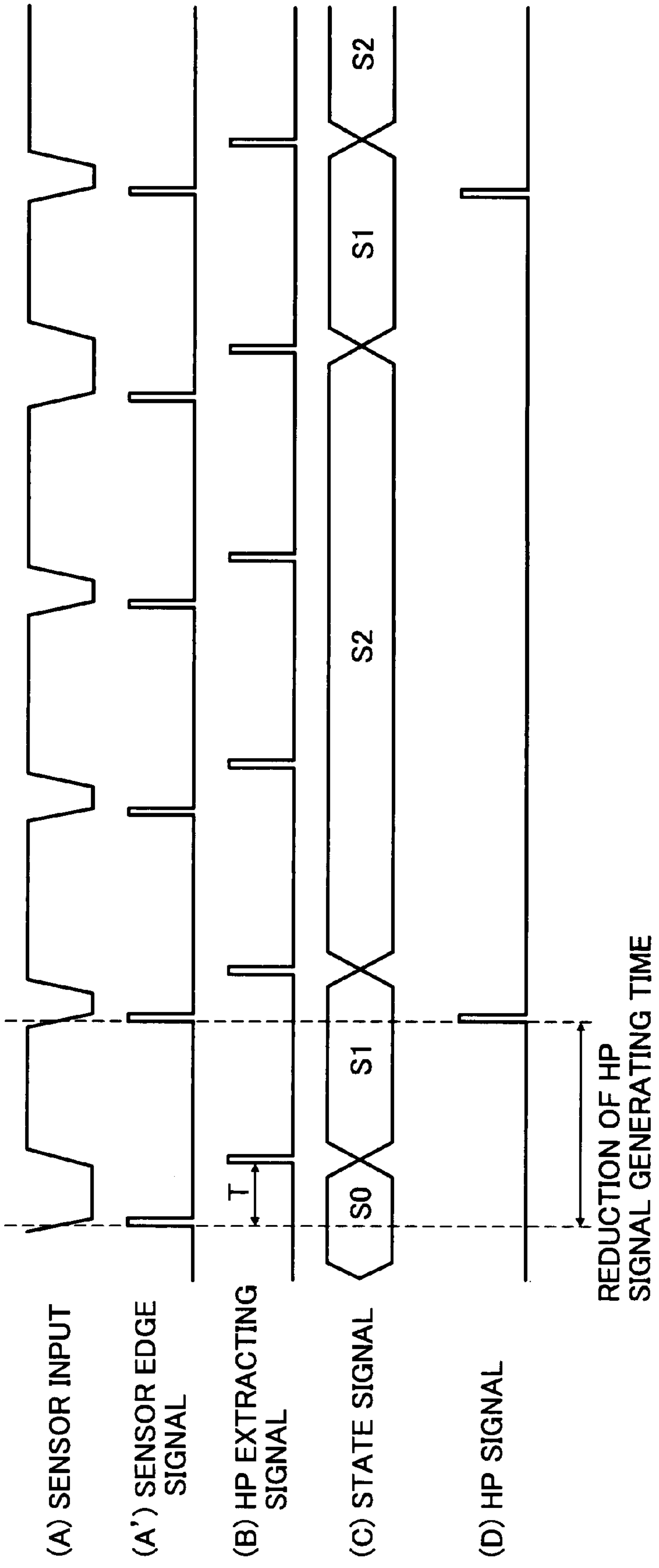
FIGS. 5A, 5A', 5B, 5C, and 5D are timing charts for explaining an operation of generating a home position signal in the rotating-body driving device.
Figure 6:
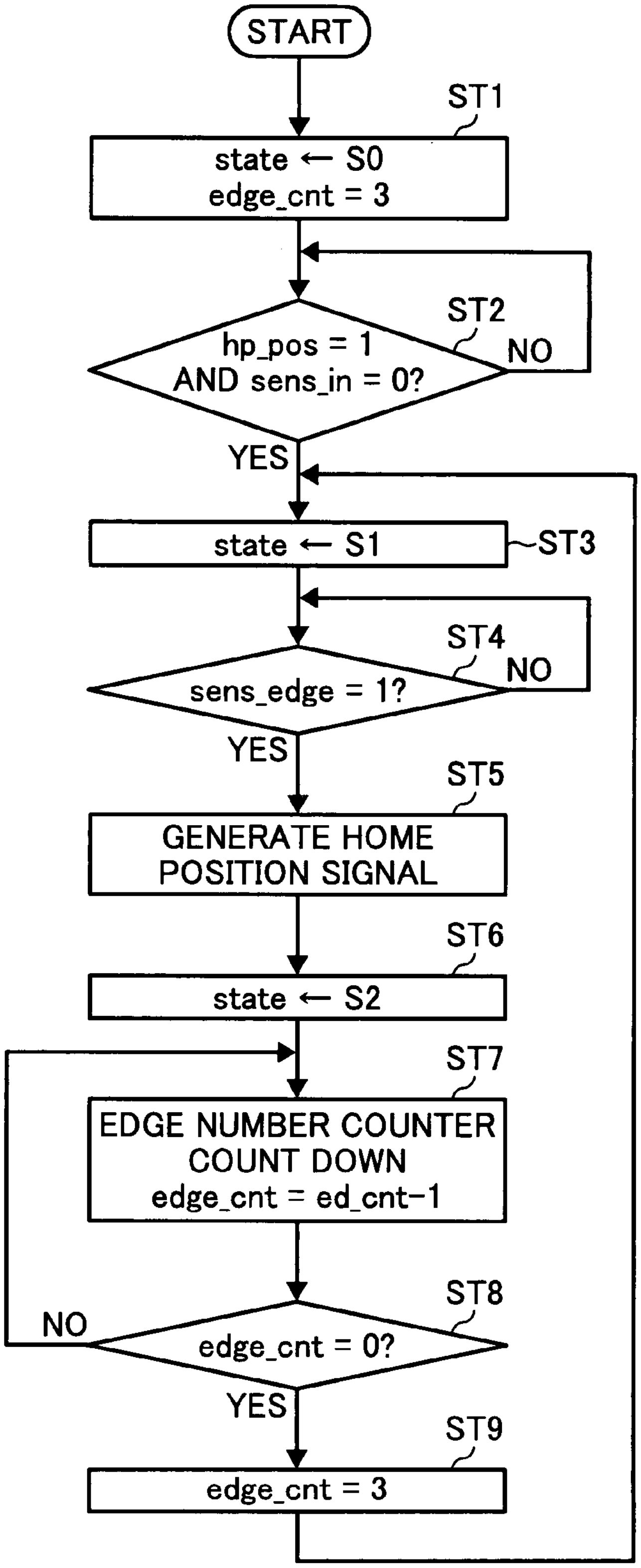
FIG. 6 is a flowchart for explaining processing of generating a home position signal in the rotating-body driving device.

A procedure of detecting a home position is explained with reference to a timing chart in FIG. 5 and a flowchart in FIG. 6.

A waveform detected by the detector 37 when rotating the photoconductive drum 1 shown in FIG. 3 at a certain velocity is shown in FIG. 5A. When the detector 37 detects the detection target portions 33 to 36, an L (low) level is input to the controller 38. However, on the contrary, an H (high) level can be input to the controller 38. Inside the controller 38, a falling edge of sensor input shown in FIG. 5A is detected and a sensor edge signal shown in FIG. 5A' is generated. After a lapse of a certain time T from a timing of the sensor edge signal, a home position extracting signal shown in FIG. 5B is generated. The time T is longer than duration of the L level in sensor input from the detection target portions 34 to 36 that are not large in width and is shorter than duration of the L level in sensor input from the detection target portion 33 that is large in width. When the home position extracting signal is generated and the sensor input is in the L level, the sensor input is recognized as the detection target portion immediately before the home position (a reference rotational-position of the photoconductive drum 1). When detecting a front end of the next detection target portion in the peripheral direction (falling of sensor input), a home position signal shown in FIG. 5D is generated.

More specifically, a state signal that changes in state, for example, based on sensor input and a counter of a sensor edge signal (hereinafter, an edge number counter) are provided and an initial state of the state signal is regarded as S0, an initial value of the edge number counter is regarded as 3 that is obtained by subtracting 1 from the number of all detection target portions (at step ST1 in FIG. 6). In FIG. 6, "state" indicates a state signal, "hp_pos" a home position extracting signal (corresponds to FIG. 5B), "sens_in" sensor input (corresponds to FIG. 5A), "sens_edge" a sensor edge signal (corresponds to FIG. 5A'), and "edge_cut" an edge number counter.

When sensor input is, in generating a home position extracting signal, in the L level, state is in S1 (Yes at step ST2→ST3). When a sensor edge signal is detected based on the state, a home position signal is generated (Yes at step ST4→ST5).

State is in S2 based on the next home position extracting signal (at step ST6) and the number of edges in the following sensors is counted down (subtract) (at step ST7). Counting-down is performed when a home position extracting signal is generated. When the counted value becomes zero after performing count-down (Yes at step ST8), state is in S1 again after setting the counted value to 3 (step ST9→ST3). When a sensor edge signal is detected in the state, a home position signal is generated (Yes at step ST4→ST5). Repetition of this process from this time allows generation of a home position signal for each rotation of the photoconductive drum 1.

Figure 25:
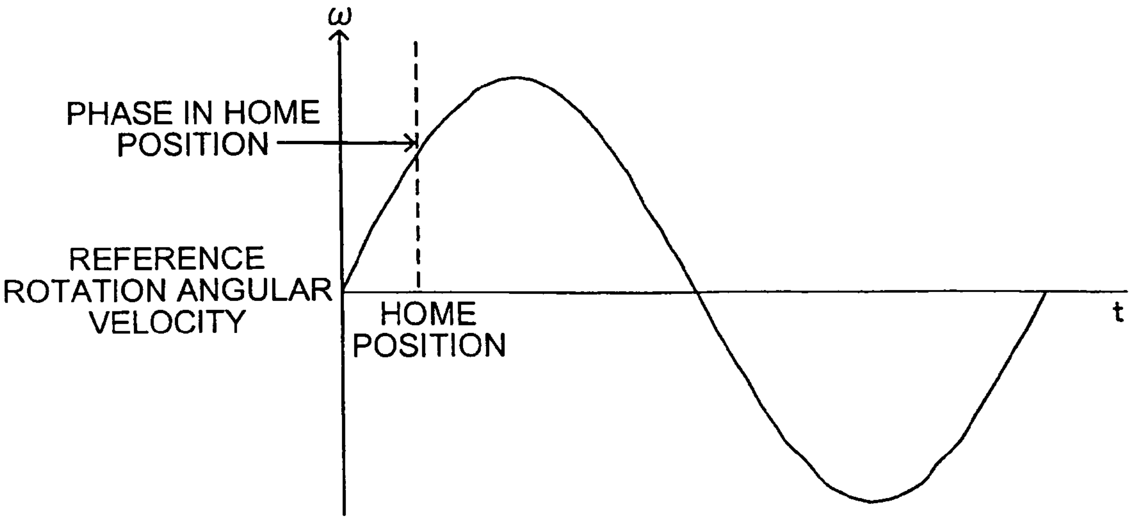
RELATED ART FIG.25
FIG. 25 is a chart for explaining periodic variation of rotation velocity measured and stored in the conventional rotating-body driving device.

The controller 38 generates a home position signal as described above, determines periodic variation information about the velocity of rotating the photoconductive drum 1 as shown in FIG. 25 by measuring spacing in a sensor edge signal or in a home position extracting signal by use of a timer, and stores the information in the EEPROM. The determination of the periodic variation information ends by rotating the photoconductive drum 1 once.

Figure 26:
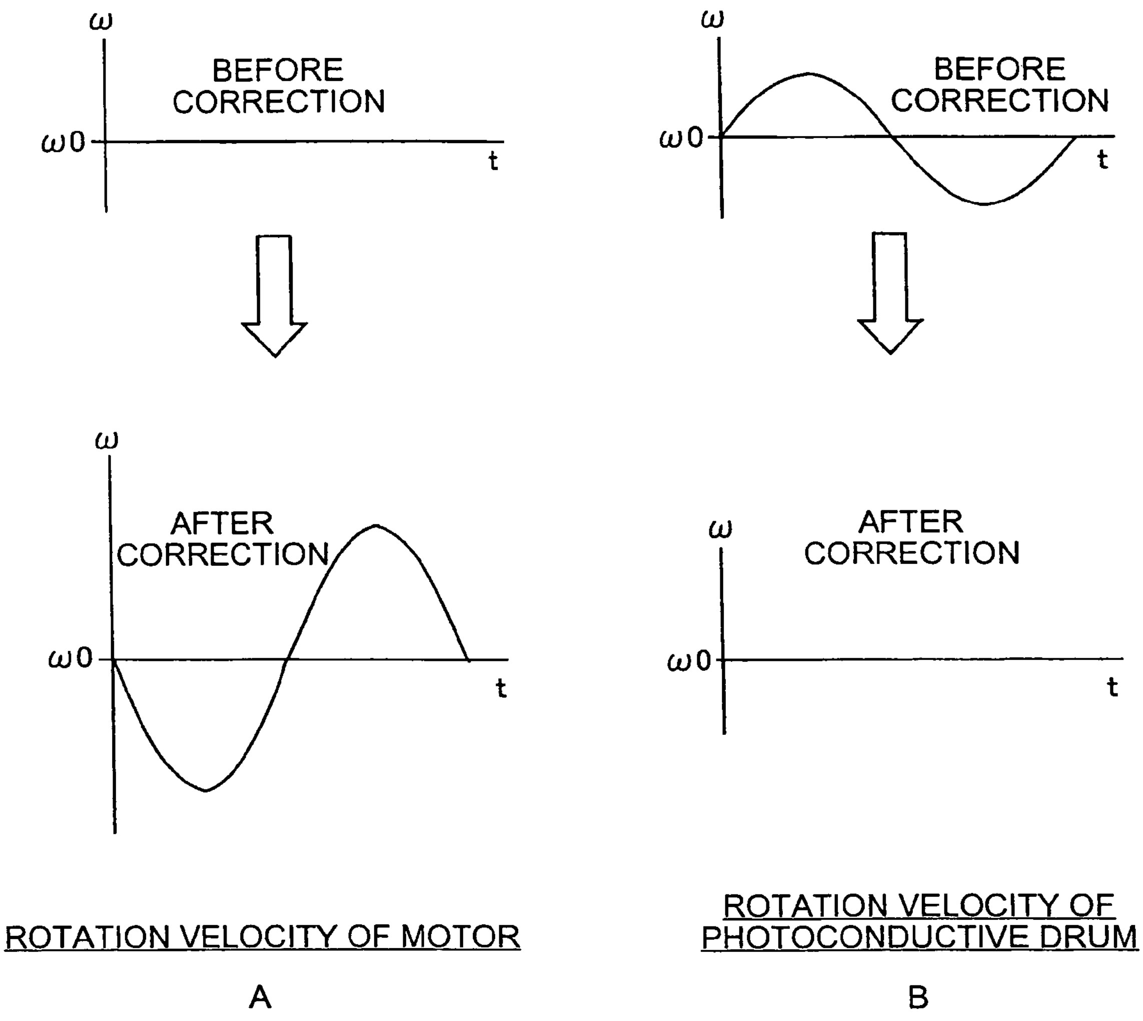
FIGS. 26A and 26B are charts for explaining a correction principle of periodic variation of the rotation velocity in the conventional rotating-body driving device.

The controller 38 outputs, when correcting velocity variation of the photoconductive drum 1, an instruction signal to drive the motor 26 at a target angular velocity ωm and rotates the motor 26. When the controller 38 determines that the rotation velocity of the motor reaches the target rotation velocity based on rotation velocity information a3 output from the angular velocity detector of the motor 26, the controller detects the home position of the photoconductive drum 1 and reads a periodic variation component stored in the EEPROM from a phase corresponding to the home position, and supplies a motor driving control signal a2 to the motor 26 to perform velocity correction in opposite phase of the periodic variation component. As a result, in the same manner as shown in FIG. 26, periodic variation in the velocity of rotating the photoconductive drum 1 is controlled.

Figure 7:
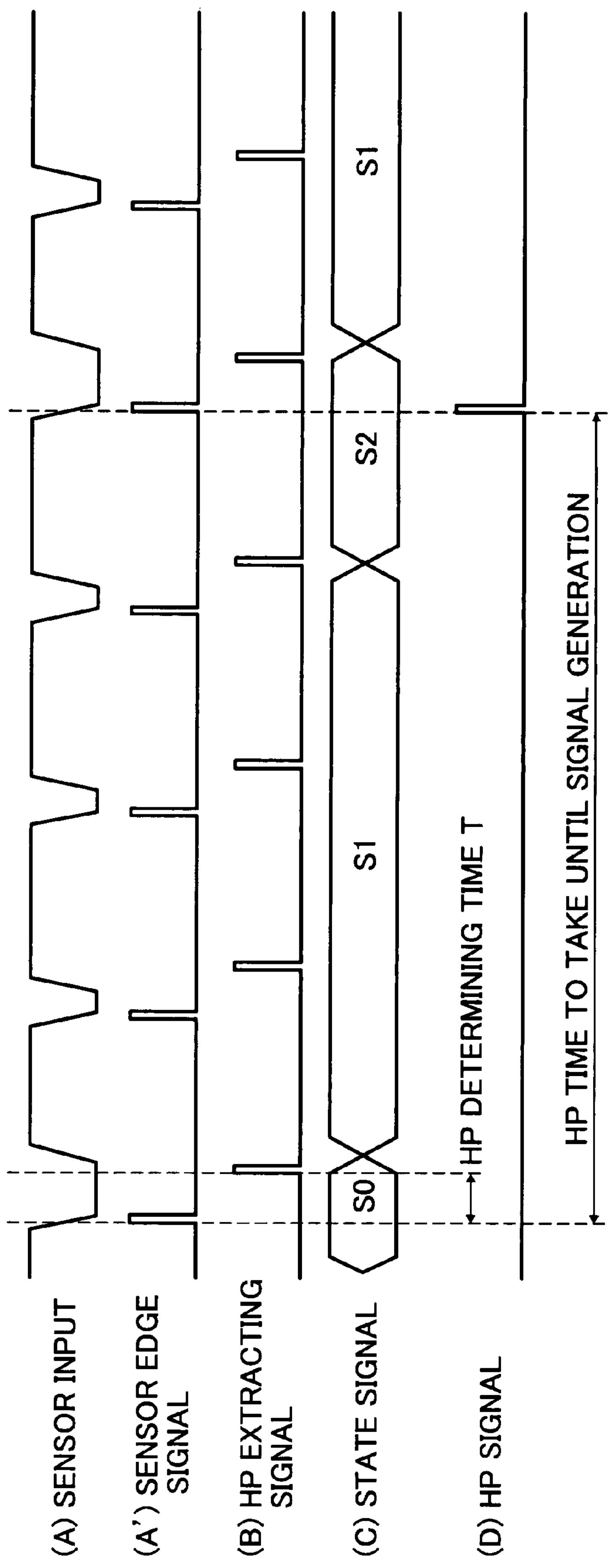
FIGS. 7A, 7A', 7B, 7C, and 7D are timing charts for explaining an operation of generating a home position signal in the above-proposed rotating-body driving device.

The rotating-body driving device according to the first embodiment is compared with the above-proposed rotating-body driving device. With regard to the above-proposed rotating-body driving device, as shown in FIG. 7, after falling of sensor input with respect to the detection target portion that has a larger width (a sensor edge at the beginning of FIG. 7A') is detected, the photoconductive drum rotates once and a home position signal is generated when falling of sensor input with respect to the detection target portion that has a larger width (a fifth sensor edge from the beginning of FIG. 7A') is next detected. With regard to the rotating-body driving device according to the first embodiment, after falling of sensor input with respect to the detection target portion 33 that has a larger width (a sensor edge at the beginning of FIG. 5A') is detected, the photoconductive drum rotates by substantially one fourth of its rotation and a home position signal is generated when falling of sensor input with respect to the detection target portion 34 that does not have a larger width (a second sensor edge from the beginning of FIG. 5A') and that is provided next to the wider detection target portion 33 backward in a rotation direction is next detected, leading to an earlier timing to start correcting velocity variation of the photoconductive drum 1.

Thus, according to the first embodiment, it is possible to reduce time before starting correction because time to take before generating a home position signal is ¼ in the case of the four detection target portions and 1/n in the case of n-number detection target portions, compared with the above-proposed rotating-body driving device that takes a rotation cycle after the detection target portion 33 that is different in width is detected. As a result, the rotating-body driving device is applied to a process cartridge or a photoconductive drum driving part so that it is possible to respond to a request of reducing time to obtain a first copy from the image forming apparatus.

Figure 8:
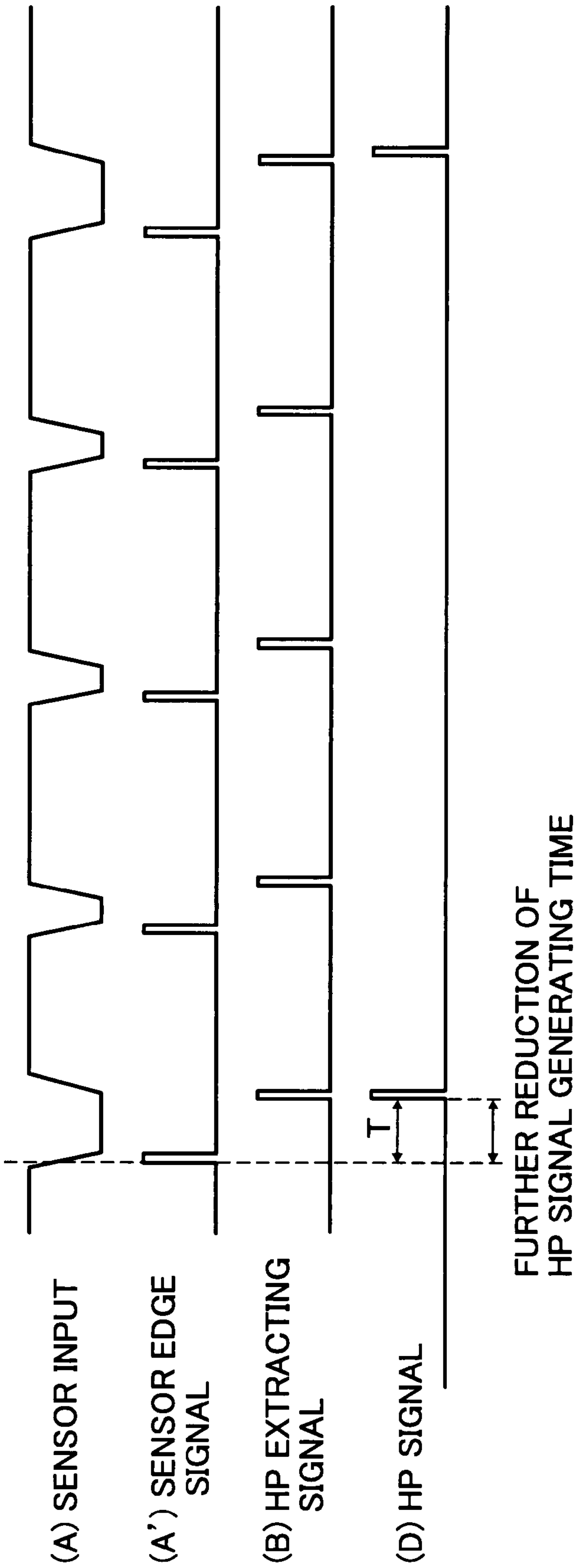
FIGS. 8A, 8A', 8B, and 8D are timing charts for explaining an operation of generating a home position signal in the rotating-body driving device according to a second embodiment of the present invention.
Figure 9:
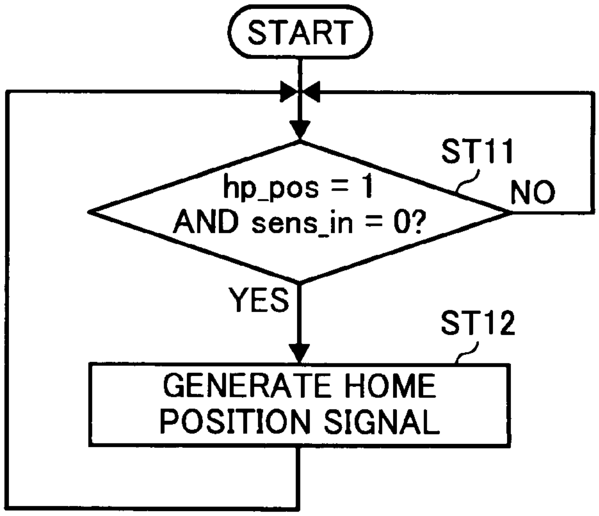
FIG. 9 is a flowchart for explaining processing of generating a home position signal in the rotating-body driving device.
Figure 10:
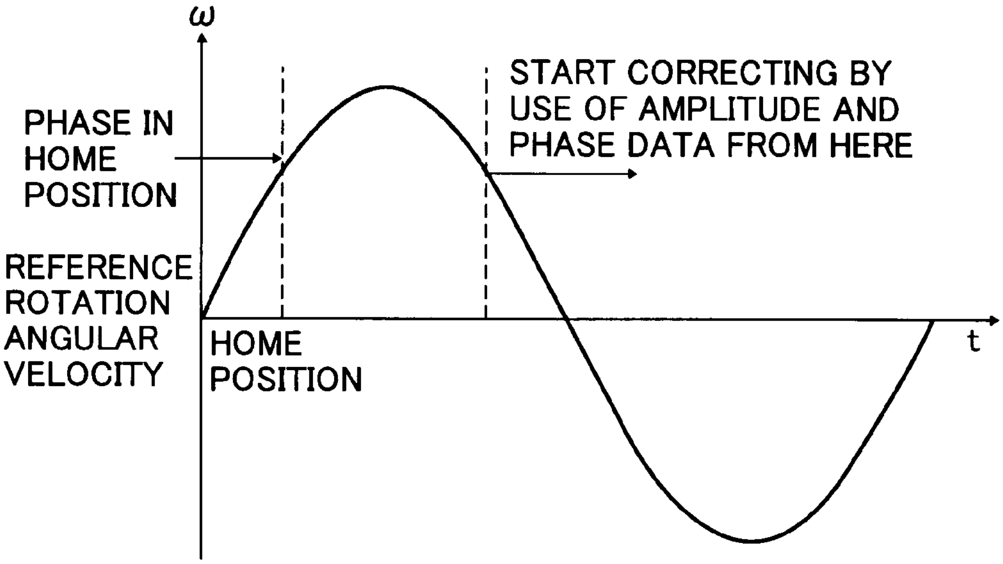
FIG. 10 is a timing chart for explaining correction processing of rotation velocity in the rotating-body driving device.

FIG. 8 is a timing chart for explaining an operation of the rotating-body driving device according to a second embodiment of the present invention. FIG. 9 is a flowchart for explaining processing of generating a home position signal. FIG. 10 is a chart for explaining a waveform of a periodic variation component and timing for reading. A basic configuration of the rotating-body driving device according to the second embodiment is the same as in the first embodiment (FIG. 3). A configuration of performing the following operation takes less time before starting correction than in the first embodiment.

First of all, a home position extracting signal is generated at the same timing as in the first embodiment (FIG. 8B). When sensor input of the detection target portion 33 (FIG. 8A) at the time of generation of a home position extracting signal is in the L level, it is determined that the photoconductive drum passes a home position (Yes at step ST11 in FIG. 9) and a home position detecting signal (FIG. 8D) is generated immediately after the determination (at step ST12). At that time, a time delay T occurs from a front end of the detection target portion 33 in the peripheral direction. With regard to data of detecting a periodic variation component, the time T is added in the controller 38 to store the data in the EEPROM.

In other words, for example, when detection data at the time of generation of a home position signal is F (t), F (t+T) is stored as detection data. Thus, the time delay T to determine from an edge of sensor input to a home position can be corrected. When correcting periodic variation, a time delay can be corrected by starting correction of shifting a phase by a time T, as shown in FIG. 10, based on the result obtained from calculation of detection data.

That is, when sinusoidal velocity variation due to decentering occurs in rotation velocity data at a home position, the value of velocity variation is $\omega$+A sin($\omega$t+$\alpha$), where $\omega$ is basic angular velocity (angular velocity without decentering, A is amplitude of velocity variation, and $\alpha$ is phase, and velocity variation at a home position is $\omega$+A sin $\alpha$. However, when a home position is detected, according to the second embodiment, velocity variation at the time of generating a home position is $\omega$+A sin($\omega$T+$\alpha$), and periodic variation in rotation velocity can be corrected by using correction data in opposite phase of the resulting value after detection of the home position.

The T is a very short time, compared with a rotation of the drum (for example, 1/444 of a rotation of the drum in the case of a rotation of the drum (1.5 Hz: 666 ms), a time of passing the detection target portion 33 that has a larger width: 2 ms, a time of passing the detection target portion 34 that does not have a larger width: 1 ms, and timing of generating a home position extracting signal: 1.5 ms).

Figure 11:
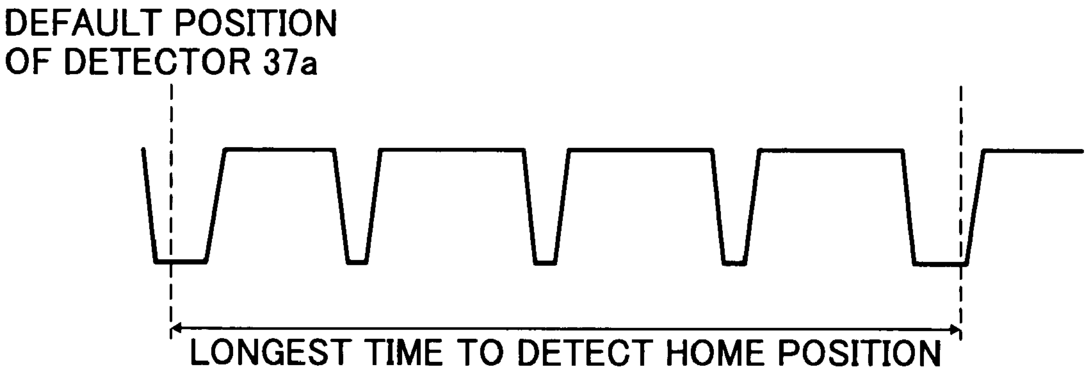
FIG. 11 is a chart for explaining the longest time to detect a home position in the above-proposed rotating-body driving device.

As described above, according to the first and the second embodiments, it is necessary to first detect the detection target portion 33 that has a larger width by the detector 37 and then a home position when starting correction of periodic variation in rotation velocity. The presence of only one detection target portion 33 that has a larger width in a rotation of the photoconductive drum causes detection of a home position to take time by about a rotation of the drum at the maximum based on a stop position of the photoconductive drum before the drum rotating shown in FIG. 11. The time to detect a home position becomes a big problem with respect to reduction of correction starting time. Therefore, according to a third embodiment of the present invention, plural detectors are provided to detect a home position by using output of the detector that first detects the detection target portion that has a larger width and hence the above maximum time is reduced.

Figure 12:
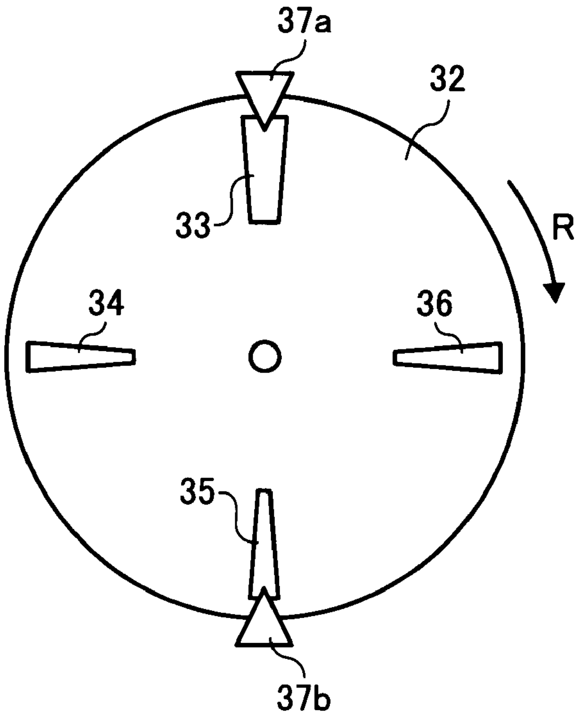
FIG. 12 is a top view for explaining a position of a detector in the rotating-body driving device according to a third embodiment of the present invention.
Figure 13:
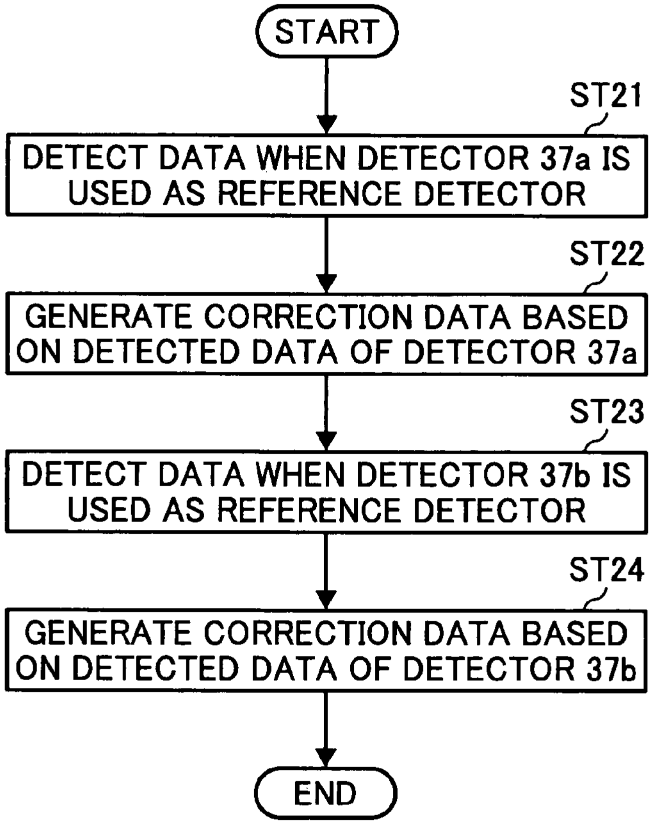
FIG. 13 is a flowchart for explaining an operation of the rotating-body driving device.
Figure 14:
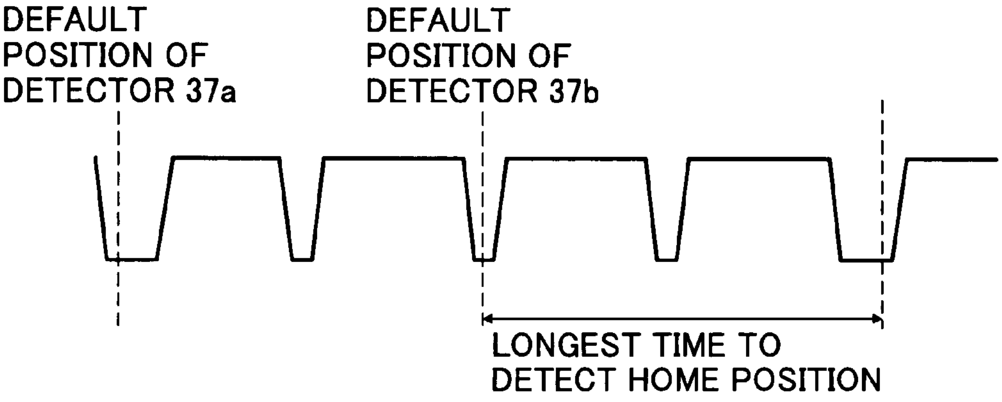
FIG. 14 is a chart for explaining the longest time to detect a home position in the rotating-body driving device.

As shown in FIG. 12, a pair of detectors 37*a*, 37*b* are mounted at positions in which they are opposite each other with the center of the disk 32 sandwiched therebetween, that is, near both ends of the disk in a radial direction according to the third embodiment. As shown in a flowchart of FIG. 13, first of all, a detection signal from the one detector 37*a* is used to detect and store periodic variation data in the same manner as described above and to generate correction data (at steps ST21 and ST22). Secondly, a detection signal of the other detector 37*b* is used to detect and store periodic variation data and to generate correction data (at steps ST23 and ST24). When starting correction, the detector that first detects the detection target portion 33 that has a larger width in both of two detectors 37*a*, 37*b* is regarded as a reference, and a home position signal and correction data while the detector is used as a reference are used to correct velocity variation in the following process. As shown in FIG. 14, this correction enables time to take from start of rotation of the motor 26 to detection of a home position to reduce to half of the conventional time at the maximum, that is, substantially one half of rotation cycle.

Figure 15A:
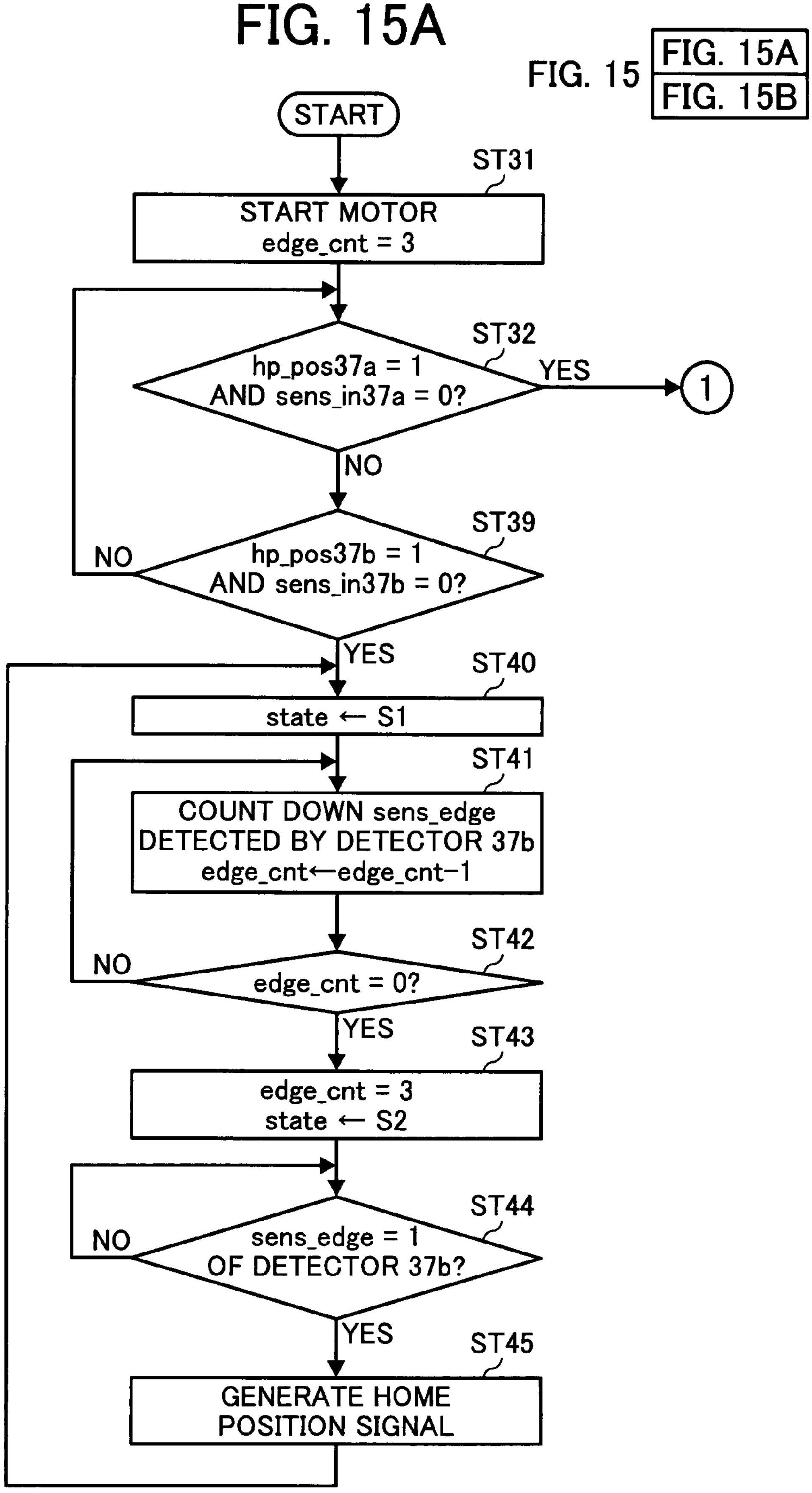
FIG. 15 is a flowchart for explaining processing of generating a home position signal in the rotating-body driving device.
Figure 15B:
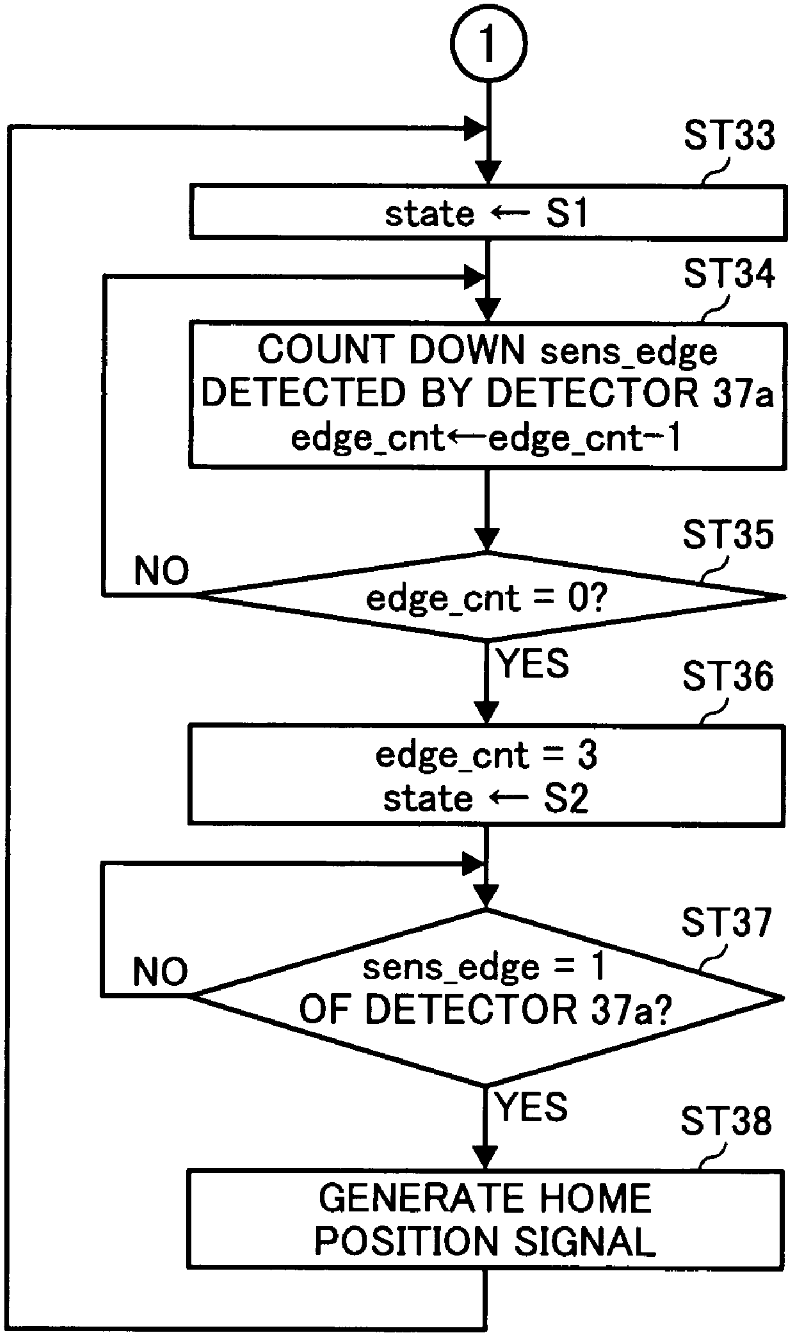

FIG. 15 is a flowchart for explaining processing of generating a home position signal. In FIG. 15, hp_pos37*a*, 37*b* represent home position extracting signals (that correspond to FIG. 5B) generated based on a sensor edge signal (that corresponds to FIG. 5A') of the detectors 37*a*, 37*b* respectively and sens_in37*a*, 37*b* represent sensor input (that corresponds to FIG. 5A) detected by the detectors 37*a*, 37*b* respectively.

As shown in FIG. 15, the motor 26 starts rotating and an edge number counter is set to 3 (at step ST31). A home position extracting signal is generated based on a sensor edge signal of the detector 37*a* and it is determined whether sensor input of the detector 37*a* is zero at that timing (at step ST32). When the determination is yes at step ST32, the same processing as processing that is represented in the timing chart after a lapse of home position determining time T in FIG. 6 is performed at steps ST33 to ST38 to generate a home position signal. When the determination is no at step ST32, the same processing as processing that is represented in the timing chart after a lapse of home position determining time T in FIG. 7 is performed at steps ST40 to ST45 to generate a home position signal. In other words, when the detector 37*a* first detects the detection target portion 33 that has a larger width, steps ST33 to ST38 are performed and when the detector 37*b* first detects the detection target portion 33 that has a larger width, steps ST40 to ST45 are performed.

In FIG. 12, two detectors 37*a*, 37*b* are arranged at the peripheral edge of the disk 32 with spacing of 180 degrees. When four detectors 37*a*, 37*b*, 37*c*, and 37*d* are arranged at the peripheral edge of the disk 32 with spacing of 90 degrees shown in FIG. 16, correction can be performed in one fourth of a conventional time shown in FIG. 17. An addition of another detector allows starting correction at an earlier time.

Figure 16:
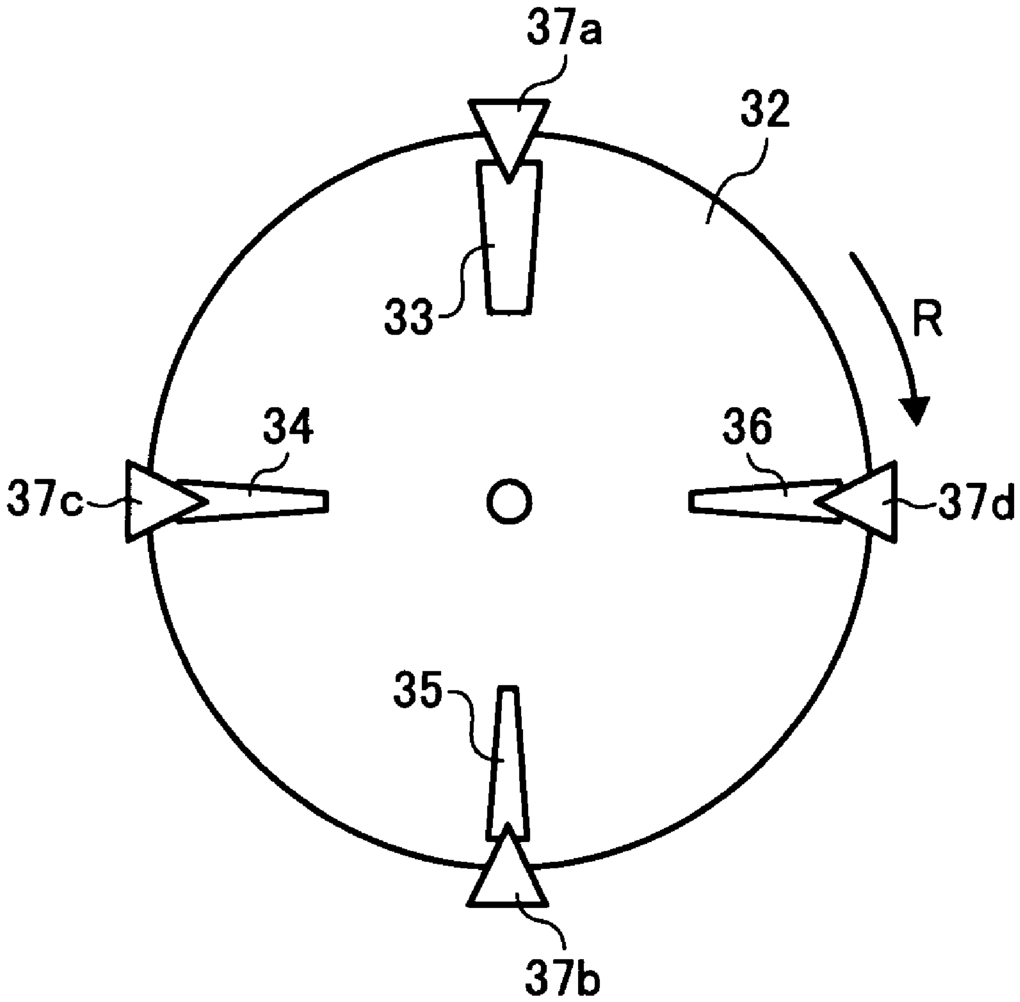
FIG. 16 is a top view for explaining a modified example of arranging a detector in the rotating-body driving device.
Figure 17:
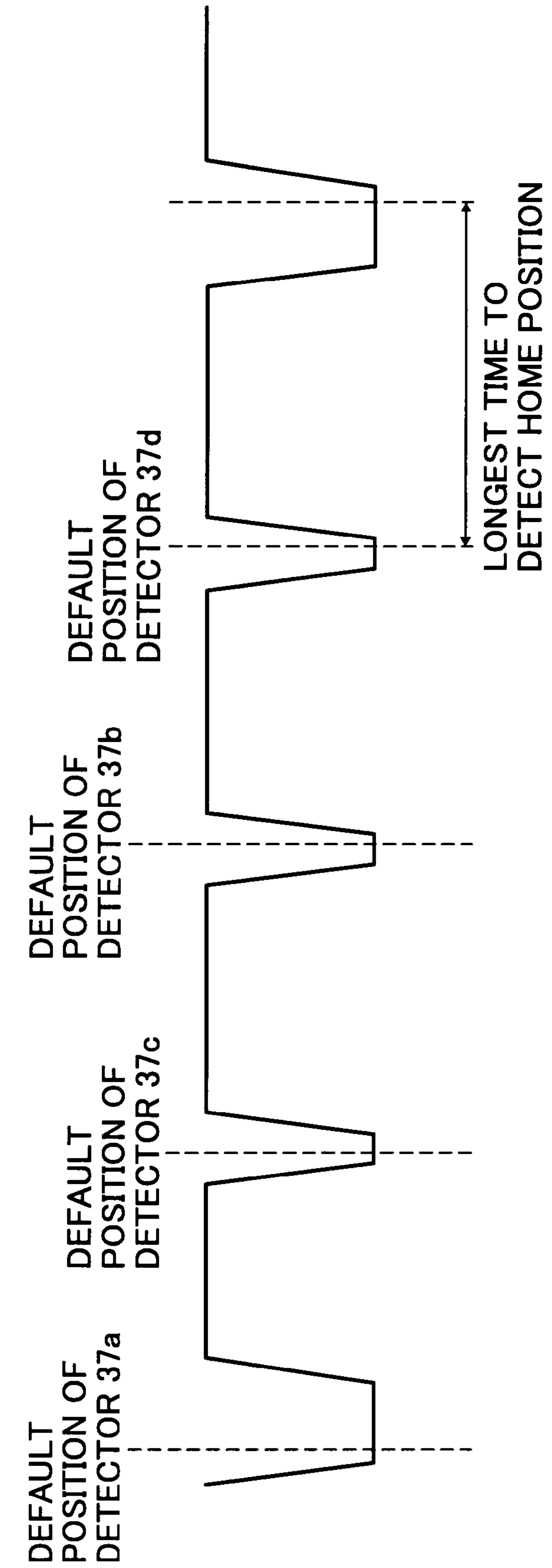
FIG. 17 is a chart for explaining the longest time to generate a home position signal in the modified example of the rotating-body driving device.
Figure 18:
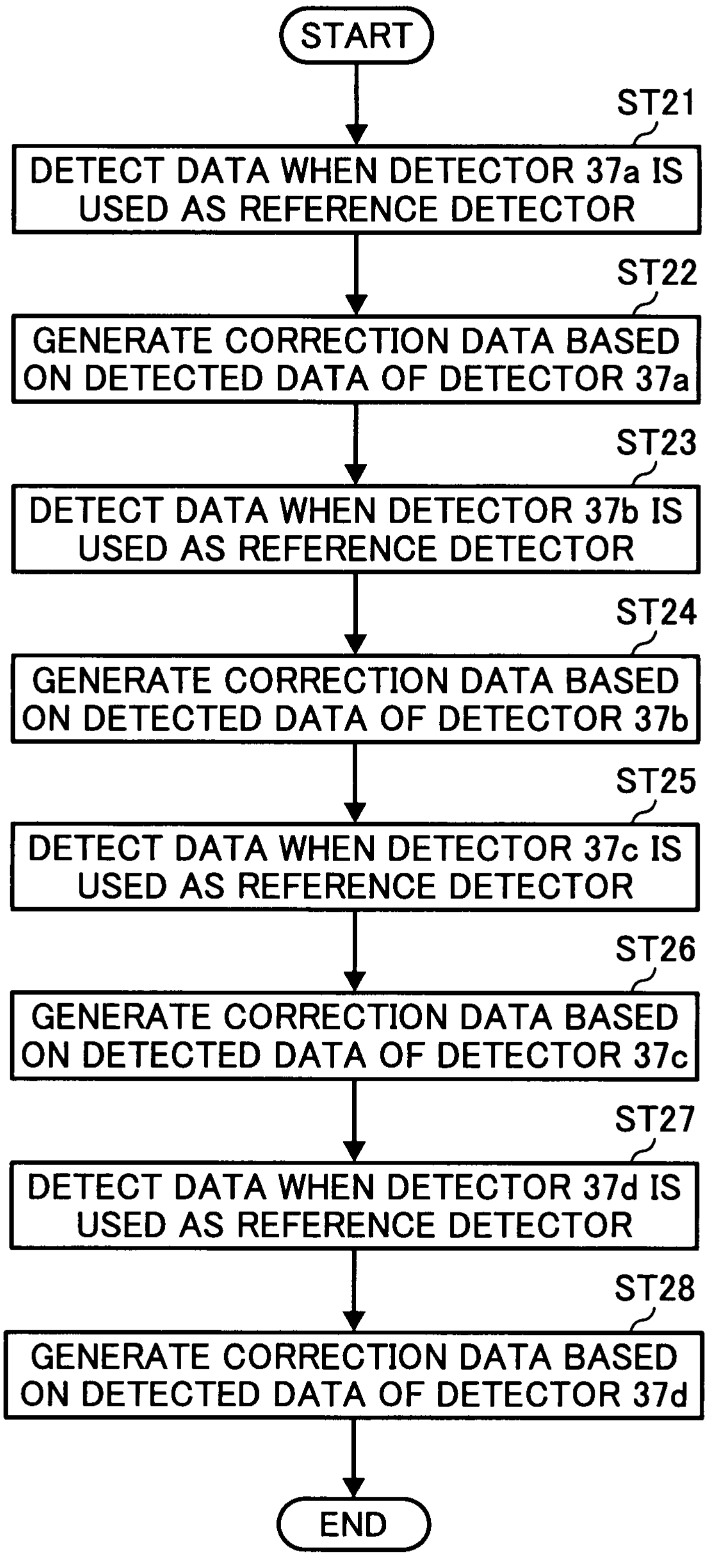
FIG. 18 is a flowchart for explaining an operation in the modified example of the rotating-body driving device.
Figure 19A:
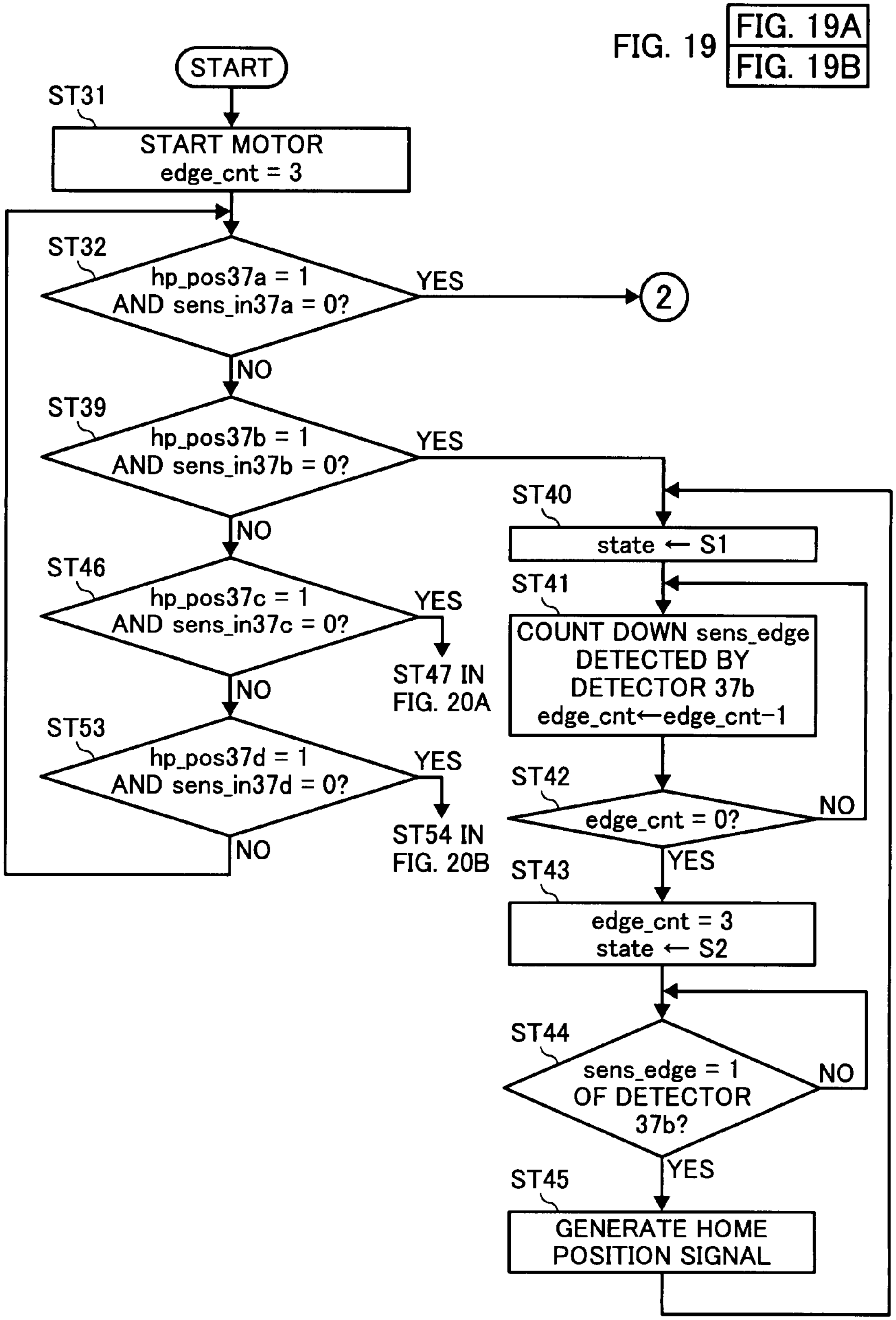
FIG. 19 is a flowchart for explaining part of processing of generating a home position signal in the modified example of the rotating-body driving device.
Figure 19B:
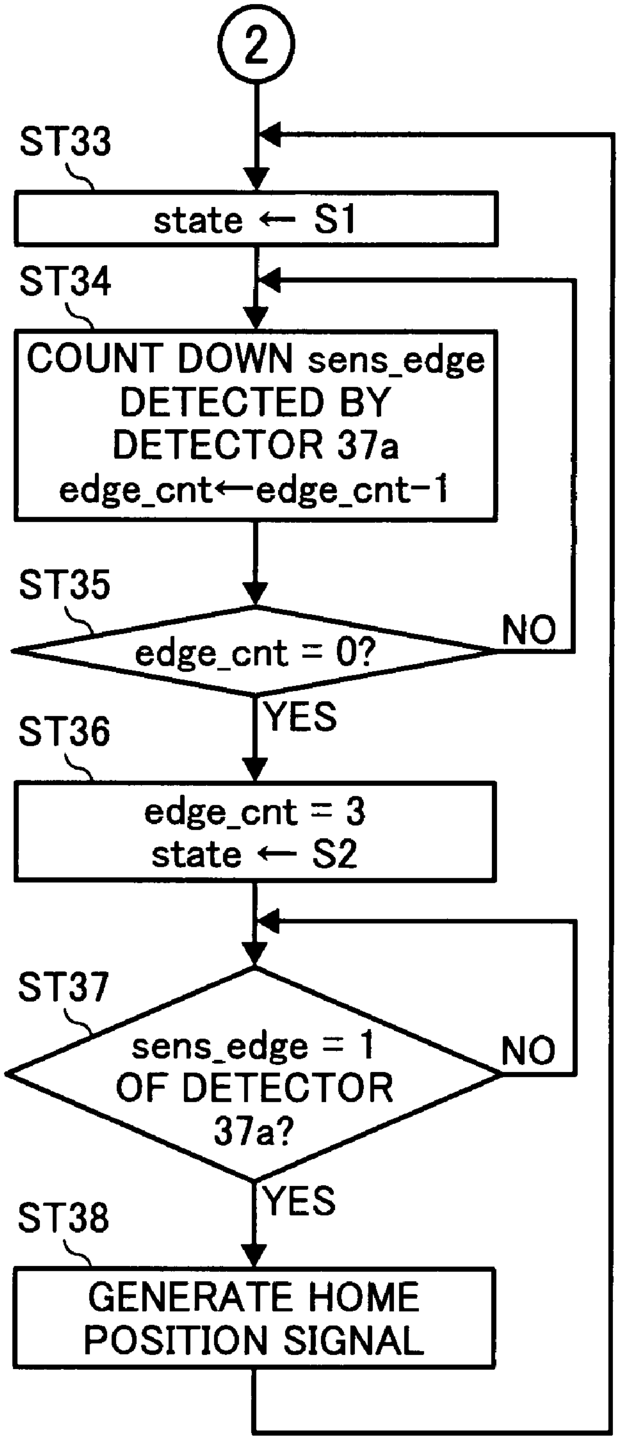
Figure 20A:
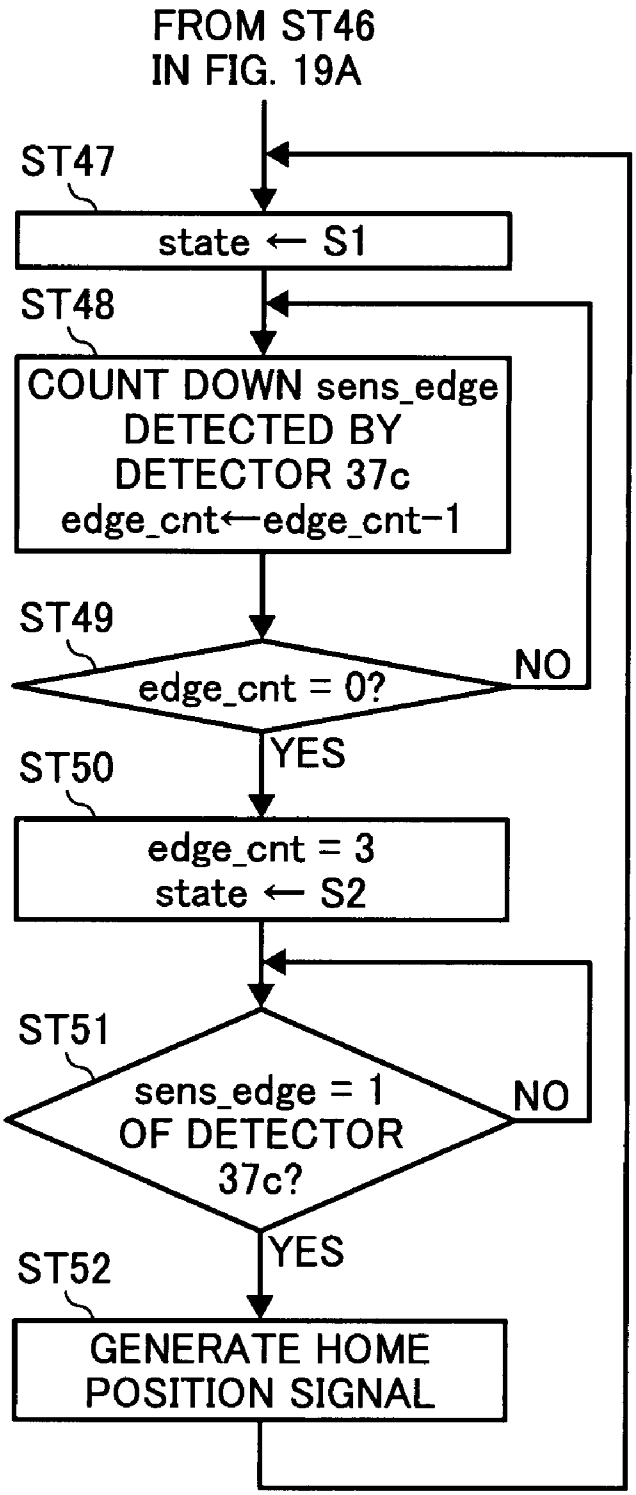
FIG. 20 is a flowchart for explaining part of the rest processing of generating a home position signal in the modified example of the rotating-body driving device.
Figure 20B:
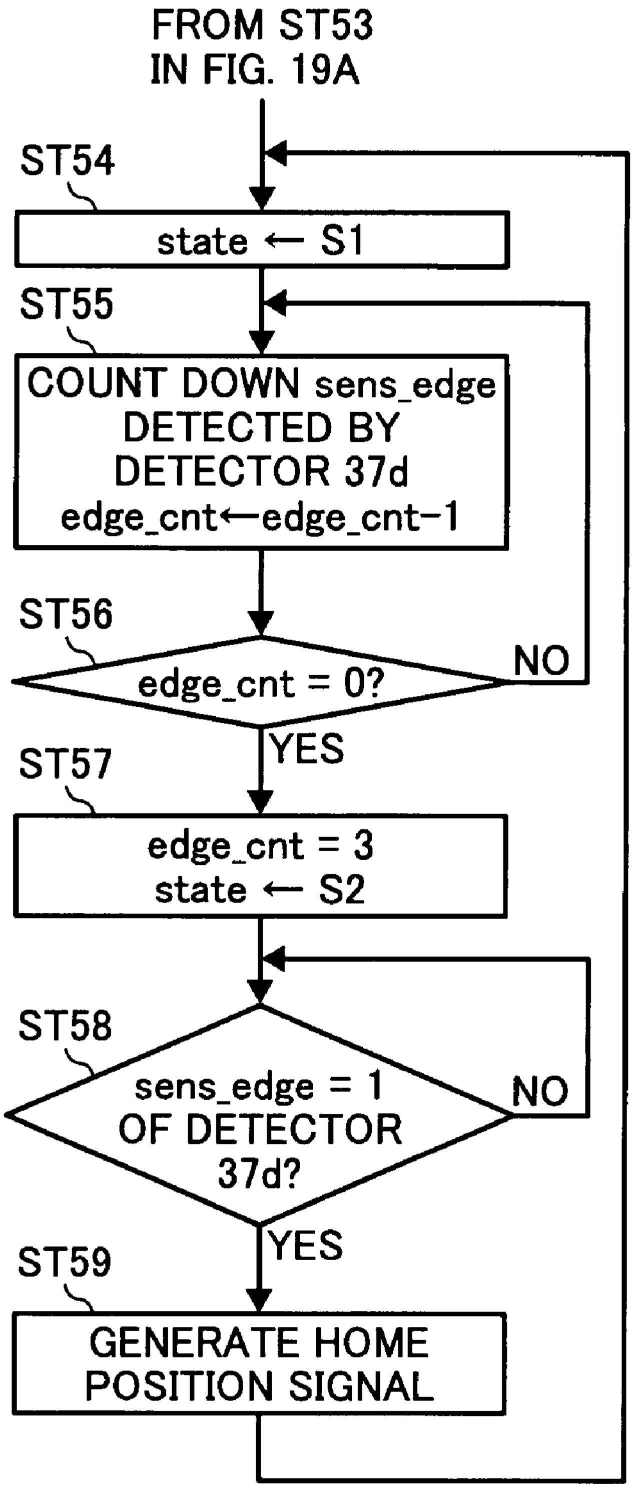

FIG. 18 is a flowchart of processing of generating data when periodic variation is generated or corrected in FIG. 16. FIGS. 19 and 20 are flowcharts of processing of generating a home position signal. The same processing in FIG. 18 as in FIG. 13 is given reference numerals and signs that are used in FIG. 13. The same processing in FIGS. 19 and 20 as in FIG. 15 is given reference numerals and signs that are used in FIG. 15. In FIGS. 19 and 20, hp_pos37*c*, 37*d* represent home position extracting signals generated based on a sensor edge signal in each of detectors 37*c*, 37*d* and sens_in37*c*, 37*d* represent sensor input detected by the detectors 37*c*, 37*d* respectively.

As shown in FIG. 18, processing of generating data when periodic variation is generated or corrected is performed in the same manner as in FIG. 13 as follows: detecting and storing periodic variation data of rotation velocity and generating correction data by using a detection signal of the detector 37*a* (at steps ST21 and ST22); detecting and storing periodic variation data of rotation velocity and generating correction data by using a detection signal of the detector 37*b* (at steps ST23 and ST24); detecting and storing periodic variation data of rotation velocity and generating correction data by using a detection signal of the detector 37*c* (at steps ST25 and ST26); and finally detecting and storing periodic variation data of rotation velocity and generating correction data by using a detection signal of the detector 37*d* (at steps ST27 and ST28). When starting correction, the detector that detects a home position the earliest among the four detectors 37*a*, 37*b*, 37*c*, and 37*d* is regarded as a reference, the home position signal and correction data are used when the detector is regarded as a reference to correct velocity variation in the following process.

In the processing of generating a home position signal shown in FIGS. 19 and 20, processing from step ST31 (processing of starting rotating the motor 26 and setting the edge number counter to 3) to step ST45 is the same in FIG. 15. Furthermore, a home position extracting signal is generated based on a sensor edge signal of the detector 37*c* and it is determined whether sensor input of the detector 37*c* is zero at the timing (at step ST46). When the determination is yes, the same processing is performed as processing that is represented in the timing chart after a lapse of home position determining time T in FIG. 7 at steps ST47 to ST52. A home position extracting signal is generated based on a sensor edge signal of the detector 37*d* and it is determined whether sensor input of the detector 37*d* is zero at the timing (at step ST53). When the determination is yes, the same processing is performed as processing that is represented in the timing chart after a lapse of home position determining time T in FIG. 7 at steps ST54 to ST59. Processing at steps ST47 to ST52 and processing at steps ST54 to ST59 are the same as at steps ST33 to ST38 in FIG. 15.

A fourth embodiment of the present invention is a combination of the first and the third embodiments. The rotating-body driving device according to the fourth embodiment, in the same manner as in the third embodiment shown in FIG. 12, is mounted with the pair of detectors 37*a*, 37*b* at positions where they are opposite each other with the center of the disk 32 sandwiched therebetween, that is, near both ends of the disk in the radial direction. When detecting a home position by using output of the detector that first detects the detection target portion 33 that has a larger width, in the same manner as in the first embodiment (FIG. 5), rising of sensor input that corresponds to the detection target portion 33 that has a larger width is detected and then the photoconductive drum 1 rotates by substantially one fourth of its rotation. When falling of sensor input that corresponds to the detection target portion 34 that does not have a larger width next to the detection target portion 33 that has a larger width backward in the rotation direction is detected, a home position signal is generated.

Figure 21:
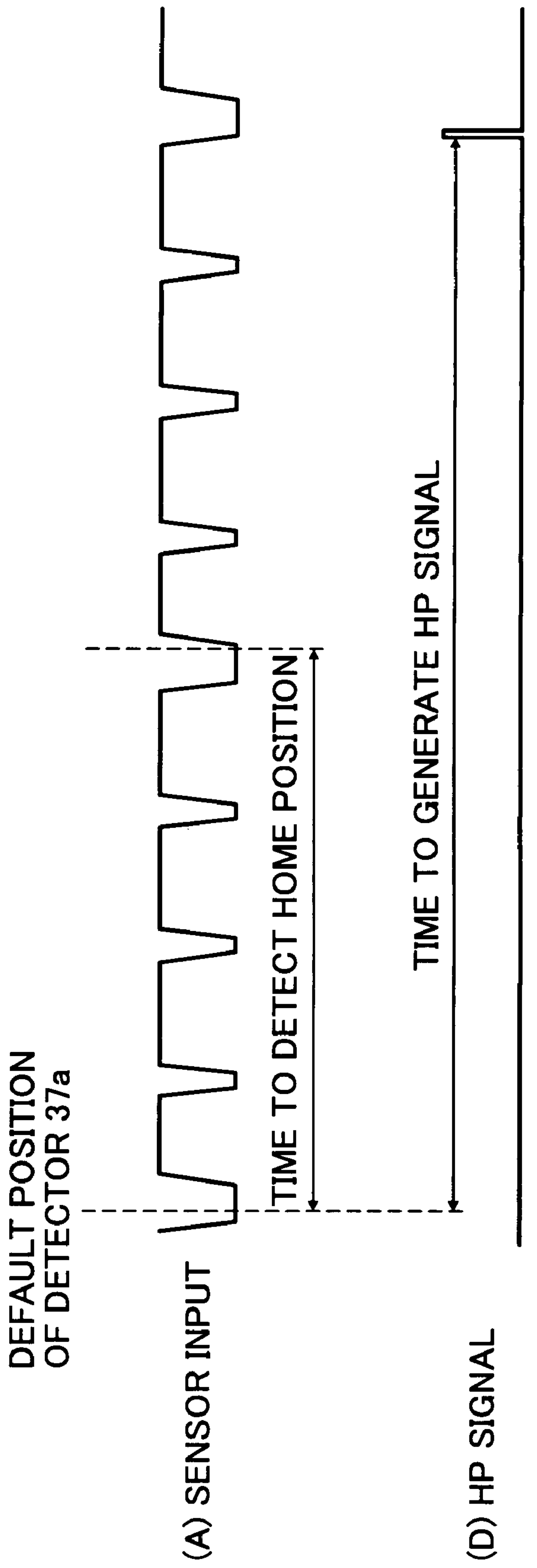
FIGS. 21A and 21D are charts for explaining the longest time to generate a home position signal in a conventional rotating-body driving device.
Figure 22:
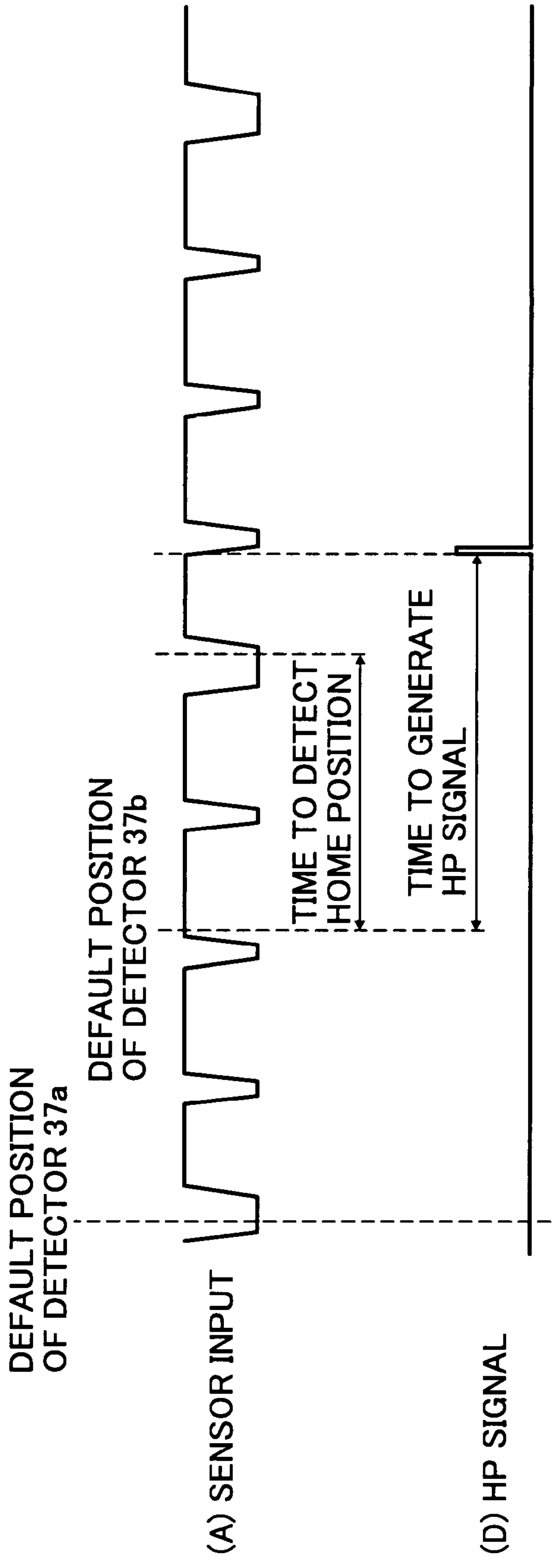
FIGS. 22A and 22D are charts for explaining the longest time to generate a home position signal in the rotating-body driving device according to a fourth embodiment of the present invention.

Thus, though, in the above-proposed rotating-body driving device, it takes a two-rotation cycle of the drum at the maximum to perform from detection of the detection target portion 33 that has a larger width to generation of a home position signal shown in FIG. 21, it is possible to start correction by a time of 37.5% compared with the conventional device because of half of a rotation+one fourth of a rotation=three fourths of a rotation in the fourth embodiment shown in FIG. 22.

Figure 23A:
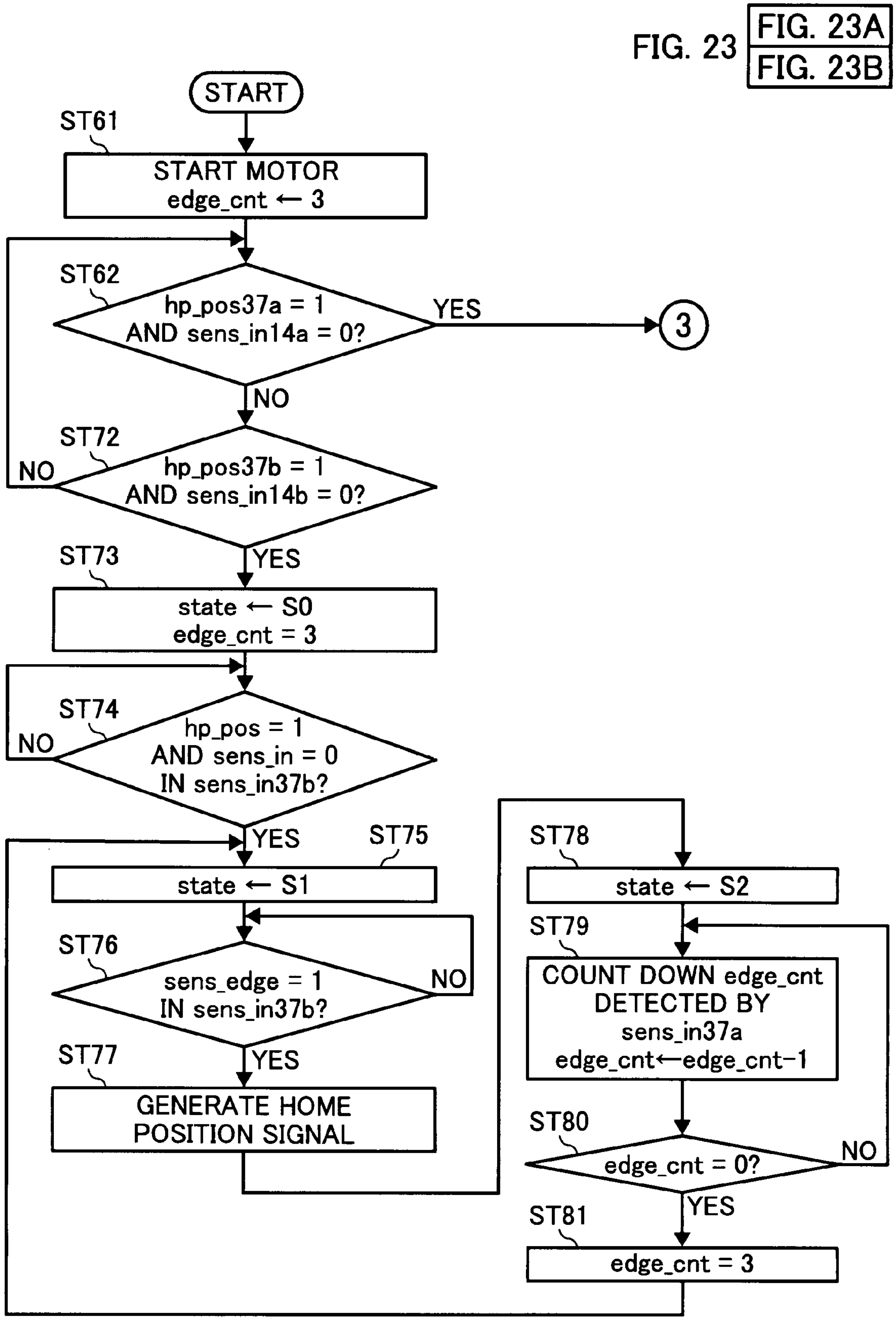
FIG. 23 is a flowchart for explaining processing of generating a home position signal in a modified example of the rotating-body driving device.
Figure 23B:
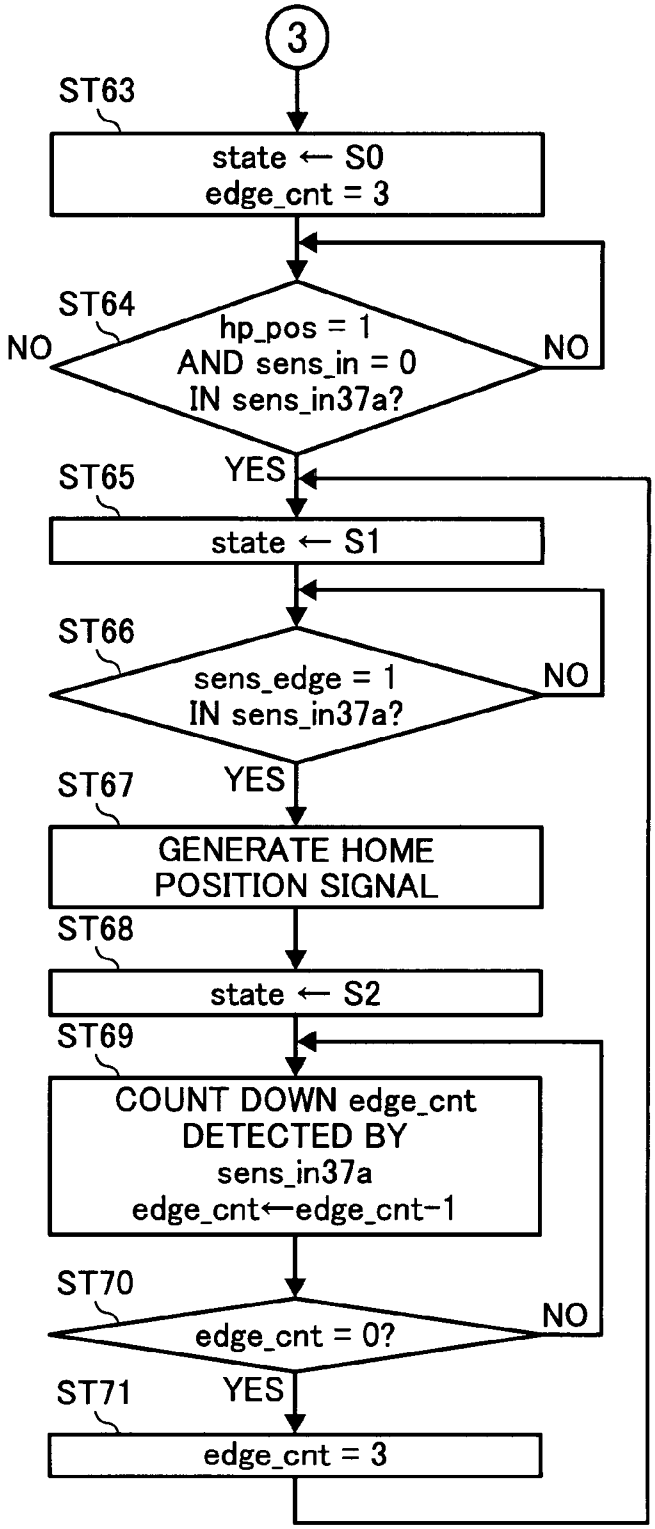
Figure 24:
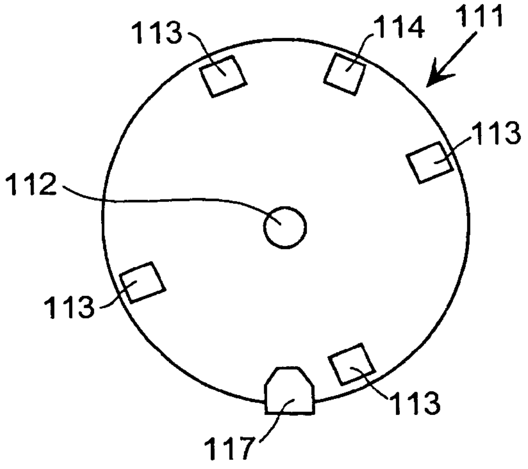
FIG. 24 is a top view for explaining a relation of the disk and the detector in the conventional rotating-body driving device.

A flowchart of processing of generating a home position signal in this event is indicated in FIG. 23. The motor 26 starts rotating and the edge number counter is set to "3" shown in FIG. 23 (at step ST61). A home position extracting signal is generated based on a sensor edge signal of the detector 37*a* and it is determined whether sensor input of the detector 37*a* at the timing is zero (at step ST62). When the determination is yes at step ST62, processing of steps ST63 to ST71 is performed to generate a home position signal. When the determination is no at step ST62, processing of steps ST73 to ST81 is performed to generate a home position signal. Processing of steps ST63 to ST71 and steps ST73 to ST81 is processing of generating a home position signal at the timing shown in FIG. 5D in the same way as at steps ST1 to ST9 in FIG. 6.

Likewise, when the number of detectors is 4 shown in FIG. 16, it is possible to start correction at a time of 25% compared with the conventional device.

The present invention according to the above embodiments can be applied to correction of periodic variation in rotation velocity that occurs in one rotation cycle of the photoconductive drum 1 and can be also applied to correction of periodic variation in rotation velocity that occurs in one rotation cycle of the motor 26. The periodic variation is mainly caused by transmission difference due to an accumulated pitch error or decentering concerning teeth of the driving gear 28. To correct the difference, a detection target portion that corresponds to one rotation cycle of the driving gear 28 can be mounted on the disk 32 shown in FIG. 4.

As described above, according to one aspect of the present invention, after the detector detects the detection target portion in which a detection signal that is different from that of the other detection target portion is generated, a reference signal for indicating a reference rotational-position of the rotating-body or rotation-driving source prior to one rotation of the rotating-body or rotation-driving source is generated. Based on the reference signal, a measured value of the previously stored periodic variation information is read from a storage unit and a rotation-velocity correction signal of the rotation-driving source is generated.

Furthermore, according to another aspect of the present invention, after the detector detects the detection target portion that has a different shape from the other detection target portion, the reference signal for indicating the reference rotational-position of the rotating-body or rotation-driving source prior to one rotation of the rotating-body or rotation-driving source is generated.

Moreover, according to still another aspect of the present invention, after the detector detects the detection target portion in which a detection signal that is different from that of the other detection target portion is generated, the reference signal for indicating the reference rotational-position of the rotating-body or rotation-driving source prior to one rotation of the rotating-body or rotation-driving source and when the detector detects the other detection target portion is generated.

Furthermore, according to still another aspect of the present invention, after the detector detects the detection target portion in which a detection signal that is different from that of the other detection target portion is generated and when the detector detects the other detection target portion, the reference signal for indicating the reference rotational-position of the rotating-body or rotation-driving source is generated.

Moreover, according to still another aspect of the present invention, after the detector detects the detection target portion in which a detection signal that is different from that of the other detection target portion is generated and before the detector detects the other detection target portion, the reference signal for indicating the reference rotational-position of the rotating-body or rotation-driving source is generated.

Furthermore, according to still another aspect of the present invention, after any one of a plurality of detectors detects the detection target portion in which a detection signal different from that of the other detection target portion is generated, the reference signal for indicating the reference rotational-position of the rotating-body or rotation-driving source prior to one rotation of the rotating-body or rotation-driving source is generated.

Moreover, according to still another aspect of the present invention, after any one of the detectors first detects the detection target portion in which a detection signal different from that of the other detection target portion is generated, the reference signal for indicating the reference rotational-position of the rotating-body or rotation-driving source is generated whenever the rotating-body or rotation-driving source rotates once.

Furthermore, according to still another aspect of the present invention, based on a signal by which any one of the detectors first detects the detection target portion in which a detection signal different from that of the other detection target portion is generated, the reference signal for indicating the reference rotational-position of the rotating-body or rotation-driving source is generated and the number of times by which the detector detects the detection target portion is counted based on timing of the reference signal. In response to the counted value, the following reference signal is generated.

Moreover, according to still another aspect of the present invention, the total number of detection target portions is set to the counter at the timing of the reference signal for indicating the reference rotational-position of the rotating-body or rotation-driving source. Whenever the detection target portions are detected, the number of the detection target portions set in the counter is reduced. When the value of the counter becomes zero, the following reference signal is generated.

Furthermore, according to still another aspect of the present invention, in the rotating-body driving device that supplies a rotation force of the rotation-driving source through the rotation force transmission mechanism to the rotating-body and also reduces periodic variation of rotation velocity of the rotating-body based on the previously-stored measured value of the periodic variation component of rotation velocity of the rotating-body, it is possible to detect a home position and a rotation velocity variation component through the same detection target portion, leading to early detection of a home position. It is also possible to form an image on the photoconductive drum in a possibly short time after starting rotation of the rotation-driving source and sufficiently respond to a request of reducing copying time.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device for driving a rotating-body, the device comprising:
- a rotation-driving source that outputs a rotation force;
- a transmission mechanism that transmits the rotation force of the rotation-driving source;
- a rotating-body that is connected to the transmission mechanism and that is rotated by the rotation force of the rotation-driving source;
- a plurality of detection target portions arranged around a rotating shaft of the rotating-body, one of the detection target portions causes a first detection signal to be generated, which is different from a second detection signal generated from other of the detection target portions;
- a detector that detects the detection target portions at a predetermined rotational-position, and generates the detection signals;
- a first reference-signal generating unit that generates a reference signal for indicating a reference rotational-position of the rotation-driving source or the rotating-body before one rotation of the rotation-driving source or the rotating-body from a timing of the first detection signal;
- a storage unit that stores measured values of periodic variation information about rotation velocity of the rotating-body, linked to phase of the rotating-body determined based on the reference signal; and
- a signal generating unit that reads the periodic variation information from the storage unit based on the reference signal, and generates a rotation-velocity correction signal for the rotation-driving source.

2. The device according to claim 1, wherein
- the one of detection target portions has a different shape from that of the other of the detection target portions, and
- the detector generates a detection signal that corresponds to a shape of each of the detection target portions.

3. The device according to claim 1, wherein a timing when the first reference-signal generating unit generates the reference signal is when the detector generates the second detection signal.

4. The device according to claim 3, wherein the other of the detection target portions are arranged backward in a rotation direction of the rotating-body next to the one of the detection target portions.

5. The device according to claim 1, wherein a timing when the first reference-signal generating unit generates the reference signal is before the detector detects the other of the detection target portions arranged backward in the rotation direction of the rotating-body next to the one of the detection target portions.

6. The device according to claim 1, wherein a plurality of detectors are prepared, and the first reference-signal generating unit generates the reference signal based on the first detection signal that is generated first by the detectors.

7. The device according to claim 1, further comprising:

a counter that counts number of times of detecting the detection target portions by the detector from a timing when the reference signal is generated; and a second reference-signal generating unit that generates a following reference signal based on counted value of the counter.

8. The device according to claim 7, wherein a total number of the detection target portions is set at the timing of generating the reference signal, the total number of the detection target portions is decremented every time the detection target portion is detected, and the second reference-signal generating unit generates the following reference signal when the counted value becomes zero.

9. A process cartridge configured to be mounted on an image forming apparatus of an electrophotographic system including a photoconductive drum, the process cartridge comprising the device according to claim 1.

10. An image forming apparatus comprising the process cartridge according to claim 9.

11. A device for driving a rotating-body, the device comprising:

a rotation-driving source that outputs a rotation force;

a transmission mechanism that transmits the rotation force of the rotation-driving source;

a rotating-body that is connected to the transmission mechanism and that is rotated by the rotation force of the rotation-driving source;

a plurality of detection target portions arranged around a rotating shaft of the rotating-body, one of the detection target portions causes a first detection signal to be generated, which is different from a second detection signal generated from other of the detection target portions;

a plurality of detectors that detect the detection target portions at each predetermined rotational-position, and generate the detection signals;

a first reference-signal generating unit that generates a reference signal for indicating a reference rotational-position of the rotation-driving source or the rotating-body whenever the rotation-driving source or the rotating-body rotates once based on a timing of the first detection signal that is generated first by the detectors;

a storage unit that stores a plurality of sets of measured values of periodic variation information about rotation velocity of the rotating-body, each of the sets of the measured values of the periodic variation information being linked to phase of the rotating-body determined based on the reference signal generated using each of the detectors; and a signal generating unit that reads one set of the sets of measured values of the periodic variation information, which is linked to phase of the rotating-body determined based on the reference signal generated using one of the detectors that first generates the first detection signal when starting correction, from the storage unit based on the reference signal, and generates a rotation-velocity correction signal for the rotation-driving source.

12. The device according to claim 11, further comprising:

a counter that counts number of times of detecting the detection target portions by the detector from a timing when the reference signal is generated; and a second reference-signal generating unit that generates a following reference signal based on counted value of the counter.

13. The device according to claim 12, wherein a total number of the detection target portions is set at the timing of generating the reference signal, the total number of the detection target portions is decremented every time the detection target portion is detected, and the second reference-signal generating unit generates the following reference signal when the counted value becomes zero.

14. A process cartridge configured to be mounted on an image forming apparatus of an electrophotographic system including a photoconductive drum, the process cartridge comprising the device according to claim 11.

15. An image forming apparatus comprising the process cartridge according to claim 14.

16. A method of driving a rotating-body, the method comprising:

measuring including rotating a rotation-driving source at a fixed velocity to output a rotation force, supplying the rotation force to the rotating-body via a transmission mechanism, and measuring periodic variation of rotation velocity of the rotating-body;

storing measured periodic variation information linked to phase of the rotating-body determined based on reference rotational-position information of the rotating-body;

detecting including rotating the rotation-driving source at a fixed velocity, and detecting that one of a plurality of detection target portions arranged around a rotating shaft of the rotating-body from which a first detection signal different from a second detection signal generated from other of the detection target portions is generated exists at a predetermined rotational-position;

first generating including generating a reference signal for indicating the reference rotational-position of the rotation-driving source or the rotating-body before the rotation-driving source or the rotating-body rotates once after the one of the detection target portions is detected; and second generating including reading the periodic variation information based on the reference signal, and generating a rotation-velocity correction signal for the rotation-driving source.

17. A computer program product comprising a computer-usable medium having computer-readable program codes embodied in the medium that when executed cause a computer to execute the method according to claim 16.

* * * * *